(12) United States Patent
Ochiai et al.

(10) Patent No.: US 11,953,598 B2
(45) Date of Patent: Apr. 9, 2024

(54) LASER TRACKING DEVICE

(71) Applicant: MITSUBISHI HEAVY INDUSTRIES, LTD., Tokyo (JP)

(72) Inventors: Atsushi Ochiai, Tokyo (JP); Koichi Hamamoto, Tokyo (JP); Yoshinori Kamiya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/020,809

(22) PCT Filed: Nov. 12, 2021

(86) PCT No.: PCT/JP2021/041719
§ 371 (c)(1),
(2) Date: Feb. 10, 2023

(87) PCT Pub. No.: WO2022/137878
PCT Pub. Date: Jun. 30, 2022

(65) Prior Publication Data
US 2023/0305154 A1    Sep. 28, 2023

(30) Foreign Application Priority Data
Dec. 24, 2020 (JP) ................................. 2020-214709

(51) Int. Cl.
*G01S 17/66* (2006.01)
*G01S 7/481* (2006.01)
(Continued)

(52) U.S. Cl.
CPC ............ *G01S 17/66* (2013.01); *G01S 7/4814* (2013.01); *G01S 7/4816* (2013.01); *G01S 7/497* (2013.01); *G02B 26/0816* (2013.01)

(58) Field of Classification Search
CPC ...... G01S 17/66; G01S 7/4814; G01S 7/4816; G01S 7/497; G02B 26/0816
See application file for complete search history.

(56) References Cited

U.S. PATENT DOCUMENTS 3,799,676 A  *  3/1974  Chatterton ............ G01S 13/865
                                                356/141.5
5,955,724 A     9/1999  Livingston
(Continued)

FOREIGN PATENT DOCUMENTS

DE    3202432    8/1983
EP    2917681    8/2019
(Continued)

OTHER PUBLICATIONS

International Search Report dated Dec. 28, 2021 in International Application No. PCT/JP2021/041719.
(Continued)

*Primary Examiner* — Tony Ko
(74) *Attorney, Agent, or Firm* — Wenderoth, Lind & Ponack, L.L.P.

(57) ABSTRACT

A laser tracking device includes an adjustment device, a telescope, and a drive device. The adjustment device modifies the emission direction of first light wave. The telescope emits the first light wave in the emission direction modified by the adjustment device. The drive device rotates the telescope based on a predicted path of a moving body. The adjustment device provides more precision in modifying the emission direction of the first light wave than in the drive device rotating the telescope. Further, the adjustment device modifies the emission direction to offset the modification of the emission direction caused by the rotation of the telescope from a time when a tracking start condition is satisfied until the moving body is detected.

14 Claims, 23 Drawing Sheets

(51) Int. Cl.
    *G01S 7/497*     (2006.01)
    *G02B 26/08*     (2006.01)

(56) References Cited

U.S. PATENT DOCUMENTS

| | | |
|---|---|---|
| 6,057,536 A | 5/2000 | Livingston |
| 6,153,871 A | 11/2000 | Livingston |
| 8,362,410 B2 | 1/2013 | King et al. |
| 9,057,604 B1 * | 6/2015 | Fink ........................ G01S 7/497 |
| 2004/0021852 A1 | 2/2004 | DeFlumere |
| 2012/0018614 A1 * | 1/2012 | King ................. G02B 26/0816 |
| | | 250/201.9 |
| 2012/0292482 A1 * | 11/2012 | Cook ..................... G01S 17/42 |
| | | 359/846 |
| 2015/0293210 A1 | 10/2015 | Protz |
| 2021/0270568 A1 | 9/2021 | Iwashimizu et al. |

FOREIGN PATENT DOCUMENTS

| | | |
|---|---|---|
| JP | 10-123251 | 5/1998 |
| JP | 2000-68934 | 3/2000 |
| JP | 2000-206243 | 7/2000 |
| JP | 3382530 | 3/2003 |
| JP | 2017-32459 | 2/2017 |
| WO | 2020/022012 | 1/2020 |

OTHER PUBLICATIONS

Extended European Search Report issued Jan. 5, 2024 in corresponding European Patent Application No. 21910031.0.

\* cited by examiner

LASER TRACKING DEVICE

TECHNICAL FIELD

The present invention relates to laser tracking devices.

BACKGROUND

In recent years, researches have been made for laser tracking devices that use lasers to observe moving bodies that move in space, such as satellites, space debris, and the like. When tracking a moving body, a laser tracking device often waits for the moving body being detected in a state in which the optical axis of a telescope is directed to a given position on a predicted orbit of the moving body. After detecting the moving body, the laser tracking device moves the direction of the optical axis of the telescope in accordance with the moving velocity of the moving body.

Here, large aperture telescopes are used to observe the positions of moving bodies with high precision. It is however difficult to quickly modify the optical axis direction of a large aperture telescope. Further, a laser tracking device requires controlling the optical axis direction of the telescope with high precision to observe the position of the moving body with improved precision. It is however difficult to control the optical axis direction of the telescope with high precision over a wide range. In view of this, the inventors have conceived of using a first optical system that modifies the optical axis direction with relatively low precision and a second optical system that modifies the optical axis direction with relatively high precision.

Patent Literature 1 (Japanese Patent Gazette No. 3382530) discloses a size-reduced optical imaging device with high sensitivity which uses two optical systems. This optical imaging device, which is mounted on a flying body such as an aircraft or a satellite to image the earth's surface, includes an objective flat scanning mirror and a compensating flat scanning mirror. The objective flat scanning mirror is operated to cause the optical axis for light reception from the earth's surface to scan the earth's surface. The compensating flat scanning mirror reflects the light wave reflected by the objective flat scanning mirror towards an imaging device such that a still image is imaged in the imaging device while one image of the earth's surface is acquired.

CITATION LIST

Patent Literature

[Patent Literature 1] Japanese Patent Gazette No. 3382530

SUMMARY

In view of the above-described circumstances, one of objectives is to provide a laser tracking device that can track a moving body with high precision. Other objectives would be understood from the below-given recitation and the description of embodiments.

A laser tracking device according to one embodiment for achieving the above-described objective includes an adjustment device, a telescope, and a drive device. The adjustment device modifies the emission direction of first light wave. The telescope emits the first light wave in the emission direction modified by the adjustment device. The drive device rotates the telescope based on a predicted path of the moving body. The adjustment device provides more precision in modifying the emission direction of the first light wave than in the drive device rotating the telescope. Further, the adjustment device modifies the emission direction to offset the modification of the emission direction caused by the rotation of the telescope from a time when a tracking start condition is satisfied until the moving body is detected.

The above-described embodiment allows the laser tracking device to track the moving body with improved precision.

DESCRIPTION OF EMBODIMENTS

Embodiment 1

Figure 1:
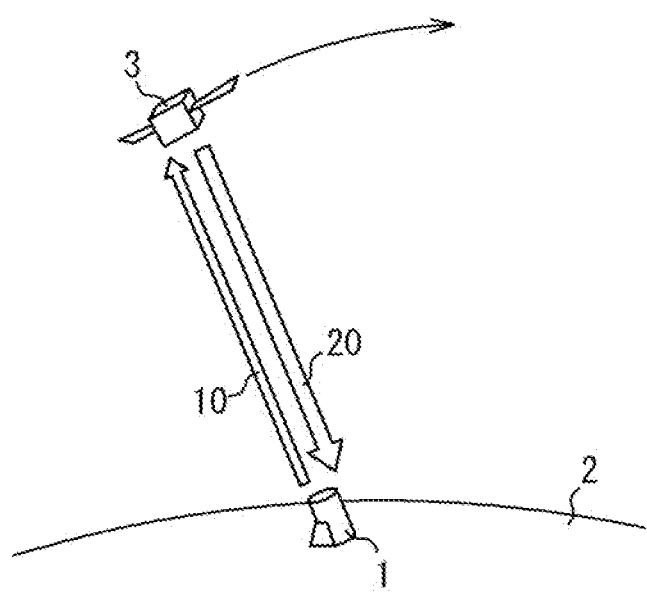
FIG. 1 is a schematic diagram of a laser tracking device, according to one embodiment.

As shown in FIG. 1, a laser tracking device 1 is installed, for example, on the ground 2 and configured to detect the position of a moving body 3. More specifically, the laser tracking device 1 emits the output light 10 such as laser light to the moving body 3 and detects the position of the moving body 3 with high precision by receiving reflected light 20 from the moving body 3. After detecting the position of the moving body 3, the laser tracking device 1 is configured to track the moving body 3 by modifying the emission direction of the output light 10 to follow the movement of the moving body 3. It is noted that the moving body 3 may include any moving object, for example, an object or flying body that circles around the earth, such as a satellite and a space debris.

Figure 2:
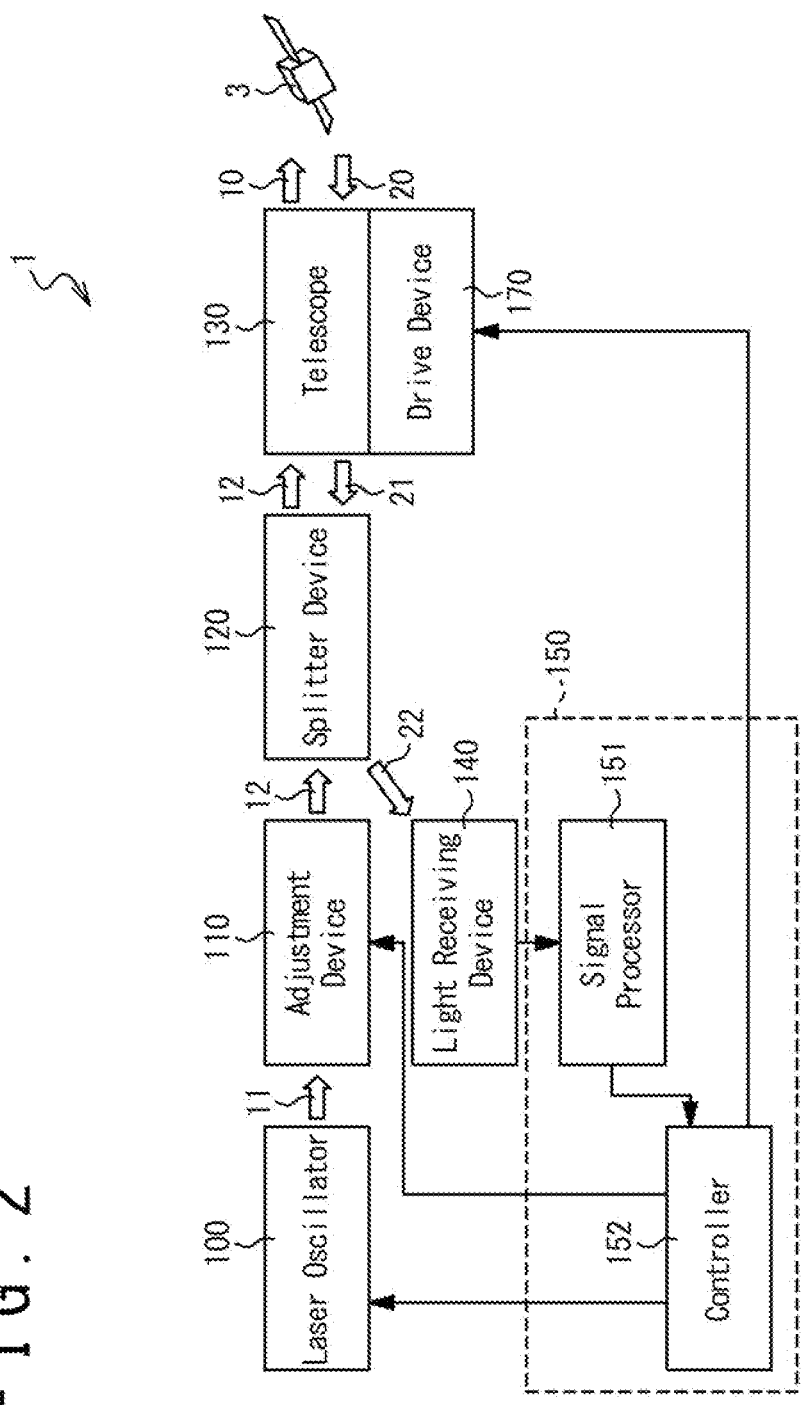
FIG. 2 is a configuration diagram of a laser tracking device, according to one embodiment.

As shown in FIG. 2, the laser tracking device 1 includes a laser oscillator 100, an adjustment device 110, a splitter device 120, a telescope 130, a light receiving device 140, a processing device 150, and a drive device 170. The drive device 170 moves the telescope 130 based on a predicted path of the moving body 3. For example, the drive device 170 rotates the telescope 130 based on the predicted path of the moving body 3. The adjustment device 110 adjusts the emission direction of the output light 10 to detect the position of the moving body 3. This allows the laser tracking device 1 to, when detecting the moving body 3, track the moving body 3 without abruptly changing the speed at which the telescope 130 is rotated. Further, the splitter device 120 allows the laser tracking device 1 to achieve both emission of the output light 10 and reception of the reflected light 20 by using the single telescope 130. It is noted that the adjustment device 110 provides more precision in controlling the emission direction of the output light 10 than in the drive device 170 controlling the emission direction of the output light 10 by rotating the telescope 130.

When the laser tracking device 1 outputs the output light 10, initial light 11 emitted by the laser oscillator 100 is outputted from the telescope 130 via the adjustment device 110 and the splitter device 120.

Figure 3:
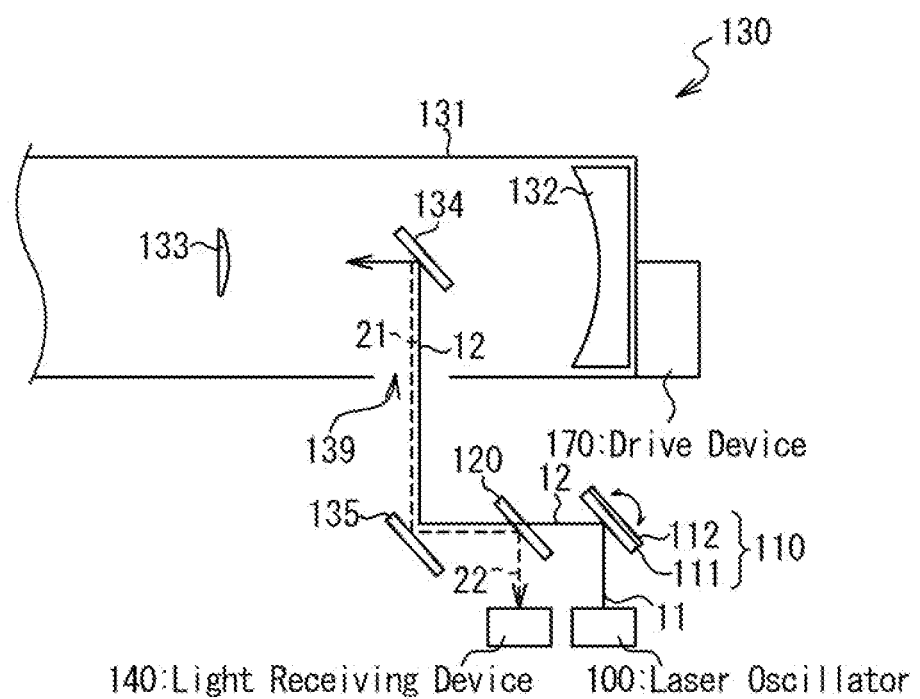
FIG. 3 is a configuration diagram of a telescope, according to one embodiment.

More specifically, as shown in FIG. 3, the laser oscillator 100 outputs the initial light 11, such as laser light, to the adjustment device 110. The laser oscillator 100 receives an emission signal generated by the processing device 150 and emits the initial light 11. The initial light 11 may be pulse laser light, for example.

The adjustment device 110 is configured to adjust the travel direction of the initial light 11 and output the same as adjusted light 12. By adjusting the travel direction of the initial light 11 by the adjustment device 110, the emission direction of the output light 10 is modified around the axial direction of the telescope 130. The adjustment device 110 includes a rotatably-disposed optical element 111 such as a mirror, and an actuator 112 that rotates the optical element 111. The optical element 111 reflects the initial light 11 to change the travel direction of the initial light 11. The actuator 112 is configured to rotate the optical element 111 with high resolution. For example, the actuator 112 is configured to adjust the rotation angle of the optical element 111, for example, in units of 10 microradians ($\mu$rad). For example, the actuator 112 includes a piezo element and the adjustment device 110 includes a piezo mirror. The rotation axis of the optical element 111 may be arbitrarily selected. The optical element 111 may have one rotation axis or two rotation axes. It is noted that the actuator 112 is driven based on a control signal generated by the processing device 150.

The splitter device 120 is configured to guide light wave from the laser oscillator 100, such as the adjusted light 12, into the telescope 130. The splitter device 120 is also configured to guide acquired light 21 received from the telescope 130 to the light receiving device 140. For example, the splitter device 120 includes a half mirror and directly guides the adjusted light 12 into the telescope 130 by letting the adjusted light 12 pass therethrough while reflecting the acquired light 21 as splitted light 22 to directly guide the splitted light 22 into the light receiving device 140.

The telescope 130 may be configured, for example, as a Coude reflecting telescope. The telescope 130 includes a tube 131 and a plurality of mirrors, for example, a first mirror 132, a second mirror 133, a third mirror 134, and a fourth mirror 135. The adjusted light 12 is reflected in turn by the fourth mirror 135, the third mirror 134, the second mirror 133, and the first mirror 132 and outputted as the output light 10 from an aperture disposed at one end of the tube 131.

The tube 131 is cylindrically shaped and configured to output the output light 10 from the one end thereof. The tube 131 also includes an aperture 139 at the side face thereof through which the adjusted light 12 is introduced.

The fourth mirror 135 is configured to guide the adjusted light 12 outputted from the splitter device 120 into the tube 131 through the aperture 139 of the tube 131. The fourth mirror 135 includes a plurality of mirrors and is configured to guide the adjusted light 12 outputted from the splitter device 120 into the tube 131 regardless of the axial direction of the tube 131.

The third mirror 134, the second mirror 133, and the first mirror 132 are arranged to output the output light 10 from an end of the tube 131. More specifically, the first mirror 132 is disposed at the end of the tube 131 in the opposite direction of the direction in which the output light 10 is outputted. The first mirror 132 has a concave reflecting surface. The second mirror 133 is disposed at the focal position of the first mirror 132. The second mirror 133 has a convex reflecting surface. The third mirror 134 is arranged to reflect the adjusted light 12 reflected by the fourth mirror 135 towards the second mirror 133. The adjusted light 12 is reflected in the tube 131 by the third mirror 134, the second mirror 133, and the first mirror 132 and outputted as the output light 10 from one end of the tube 131.

It is noted that any telescope structures may be selected for the telescope 130, not limited to the Coude reflecting telescope structure. For example, a Nasmyth reflecting telescope structure may be selected for the telescope 130. In this case, the drive device 170 may rotate the laser oscillator 100, the adjustment device 110, the splitter device 120, and the light receiving device 140 in accordance with the rotation of the telescope 130 when the emission direction of the output light 10 is rotated to a direction in the horizontal plane.

A Galilean telescope structure may be selected for the telescope 130. In this case, the drive device 170 may rotate the laser oscillator 100, the adjustment device 110, the splitter device 120, and the light receiving device 140 in accordance with the rotation of the telescope 130.

As described above, the light wave outputted by the laser oscillator 100 is outputted from one end of the telescope 130.

As shown in FIG. 2, the reflected light 20 from the moving body 3 is received by the light receiving device 140 via the telescope 130 and the splitter device 120.

As shown in FIG. 3, the telescope 130 outputs to the splitter device 120 the reflected light 20 that reaches the end of the telescope 130 as acquired light 21. More specifically, the reflected light 20 is reflected by the first mirror 132, the second mirror 133, and the third mirror 134 and outputted from the aperture 139 of the tube 131. The reflected light 20 outputted from the tube 131 is reflected by the fourth mirror 135 and guided to the splitter device 120. The fourth mirror includes a plurality of mirrors and is configured to guide the reflected light 20 outputted from the aperture 139 of the tube 131 to the splitter device 120, regardless of the direction in which the axial direction of the tube 131 is directed.

The splitter device 120 is configured to guide the acquired light 21 to the light receiving device 140 as splitted light 22. For example, the splitter device 120 includes a half mirror and reflects the acquired light 21 as the splitted light 22 to a direction different from the light axis direction of the adjusted light 12. As such, the splitter device 120 is configured to guide the adjusted light 12 from the laser oscillator 100 to the telescope 130 and also guide the acquired light 21 from the telescope 130 to the light receiving device 140.

As described above, the light wave received by the telescope 130 is guided to the light receiving device 140.

The light receiving device 140 measures, based on the splitted light 22 received from the splitter device 120, a photon count of the splitted light 22, for example, the number of photons included in the splitted light 22. When the moving body 3 exists within the emission range of the output light 10, the measured photon count includes the number of photons corresponding to the reflected light 20 from the moving body 3. As shown in FIG. 2, the light receiving device 140 transmits the measured photon count to the signal processor 151 of the processing device 150. The photon count may include the time of the light reception. The light receiving device 140 may be a photometer, for example.

The processing device 150 includes a signal processor 151 and a controller 152. The processing device 150 performs various processes to control the laser tracking device 1. For example, the processing device 150 is a computer that includes a central processor unit (CPU), a storage device, and other devices, for example. The processing device 150 may include one or more computers.

The signal processor 151 detects a moving body 3 based on the photon count from the light receiving device 140. The signal processor 151 determines whether the splitted light 22 incudes the reflected light 20 from the moving body 3 based on changes in the photon count. When the splitted light 22 incudes the reflected light 20 from the moving body 3, the signal processor 151 outputs to the controller 152 a detection signal that indicates that the moving body 3 is detected.

The controller 152 controls the laser oscillator 100, the adjustment device 110, and the drive device 170. The controller 152 controls the drive device 170 based on the predicted path of the moving body 3 to rotate the telescope 130. The controller 152 further specifies the timing at which the laser oscillator 100 is to emit the initial light 11. The controller 152 further controls the adjustment device 110 based on the detection signal from the signal processor 151 such that the output light 10 is emitted to the moving body 3.

(Operation of Laser Tracking Device)

Figure 4A:
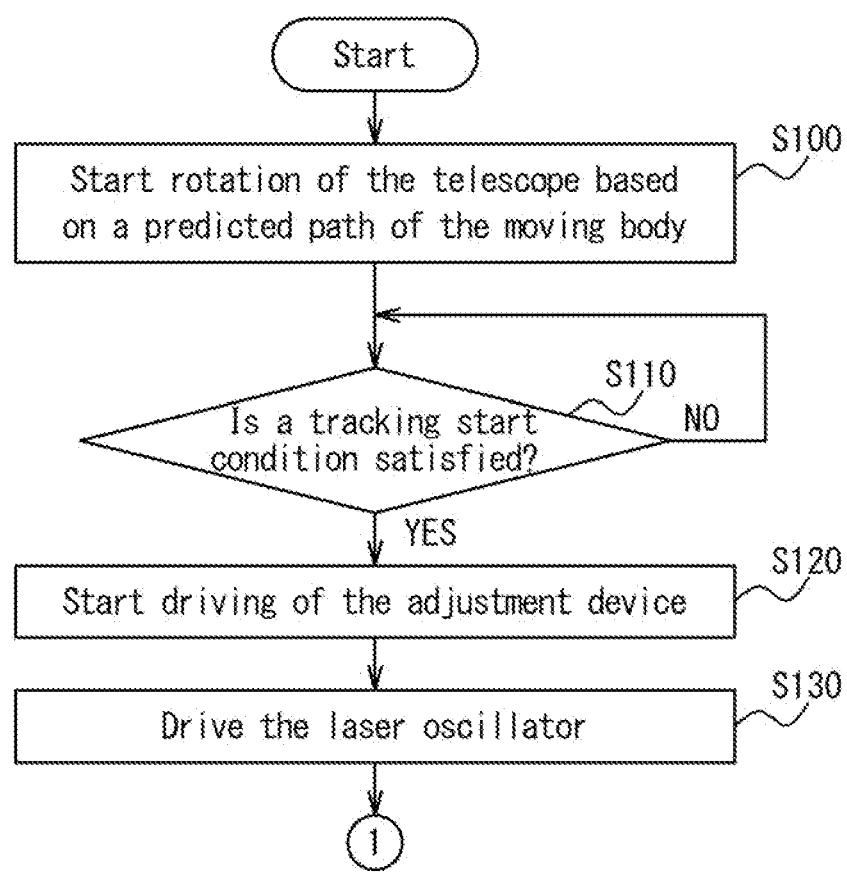
FIG. 4A is a flowchart showing the operation of a laser tracking device, according to one embodiment.
Figure 4B:
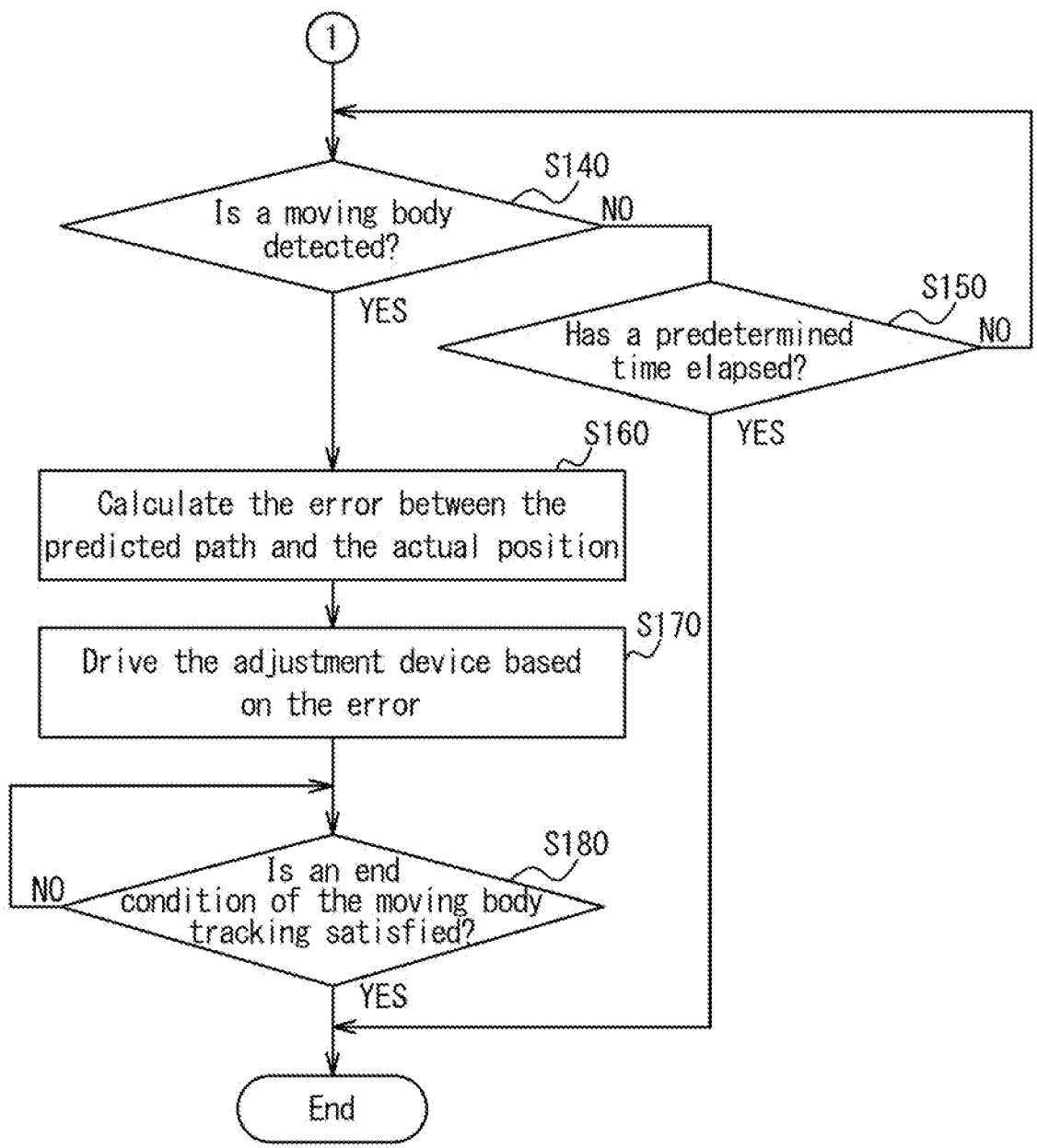
FIG. 4B is a flowchart showing the operation of a laser tracking device, according to one embodiment.

The laser tracking device 1 tracks the moving body 3 through the procedure shown in FIGS. 4A and 4B. When tracking the moving body 3, the laser tracking device 1 manually or automatically starts the procedure shown in FIGS. 4A and 4B. At step S100, the controller 152 controls the drive device 170 based on a predicted path of the moving body 3 to move the telescope 130. More specifically, the controller 152 acquires the predicted path of the moving body 3 from an external entity. The predicted path represents the path along which the moving body 3 will move and the positions of the moving body 3 at predetermined instances of time. The controller 152 generates, based on the predicted path, a signal that controls the drive device 170 such that the axis of the telescope 130 is directed towards a predicted position of the moving body 3. The drive device 170 rotates the telescope 130 such that the axis of the telescope 130 is directed towards the predicted position of the moving body 3.

Figure 5:
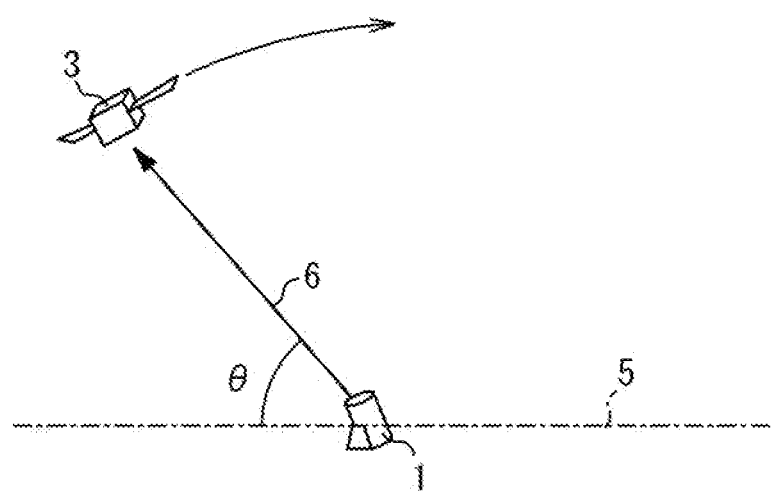
FIG. 5 is a diagram for illustrating an operation in which a laser tracking device tracks a moving body, according to one embodiment.
Figure 6:
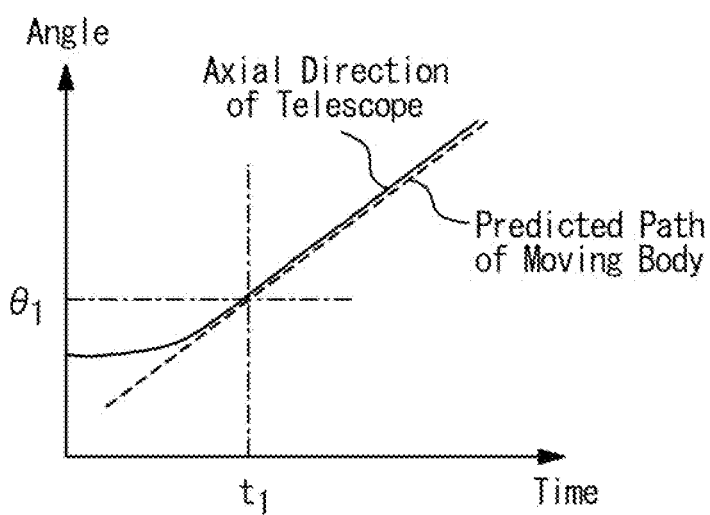
FIG. 6 is a diagram for illustrating the axial direction of a telescope rotated by a drive device, according to one embodiment.

For example, as shown in FIG. 5, an assumption is made that the moving body 3 passes right overhead of the laser tracking device 1. In this case, the controller 152 rotates the telescope 130 such that the angle θ between the horizontal plane 5 and the axis direction 6 of the telescope 130 is equal to the angle between the horizontal plane 5 and the predicted direction from the laser tracking device 1 to the moving body 3. More specifically, as shown in FIG. 6, the controller 152 accelerates the rotation speed of the telescope 130 to the speed corresponding to the travel speed of the moving body 3 and rotates the telescope 130 to move the axis direction 6 of the telescope 130 along the predicted path of the moving body 3 at step S100.

At step S10 shown in FIG. 4A, the controller 152 determines whether a tracking start condition is satisfied. The tracking start condition may include any conditions, such as the instance of time, the position of the moving body 3, the error between the rotation speed of the telescope 130 and the predicted path of the moving body 3, and the like. For example, the controller 152 determines that the tracking start condition is satisfied when the tracking start time has been reached. When determining that the tracking start condition is satisfied, the controller 152 performs the process of step S120. When determining that the tracking start condition is not satisfied, the controller 152 repeats step S110 until the tracking start condition is satisfied. For example, an assumption is made that the controller 152 starts the tracking at a tracking start time $t_1$. In this case, as shown in FIG. 6, the controller 152 rotates the telescope 130 at the tracking start time $t_1$ such that the axis direction of the telescope 130 is at a first angle $\theta_1$ which is the same as the direction of the moving body 3. Further, the controller 152 rotates the telescope 130 such that the rotation speed of the telescope 130 reaches the speed corresponding to a predicted speed of the moving body 3 at the tracking start time $t_1$.

Figure 7:
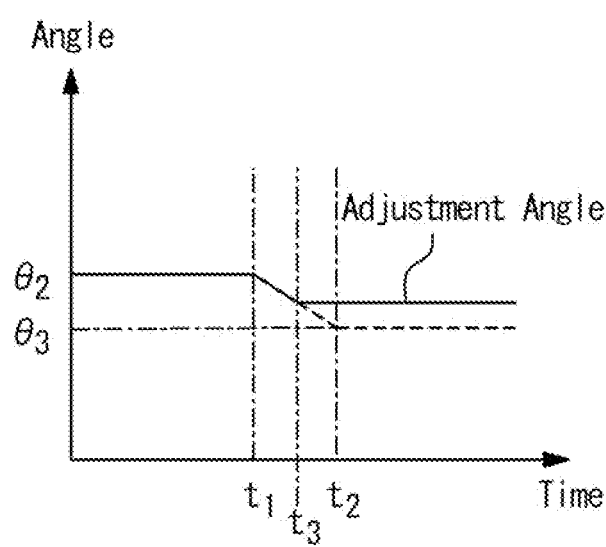
FIG. 7 is a diagram for illustrating the emission direction of output light adjusted by an adjustment device, according to one embodiment.
Figure 8:
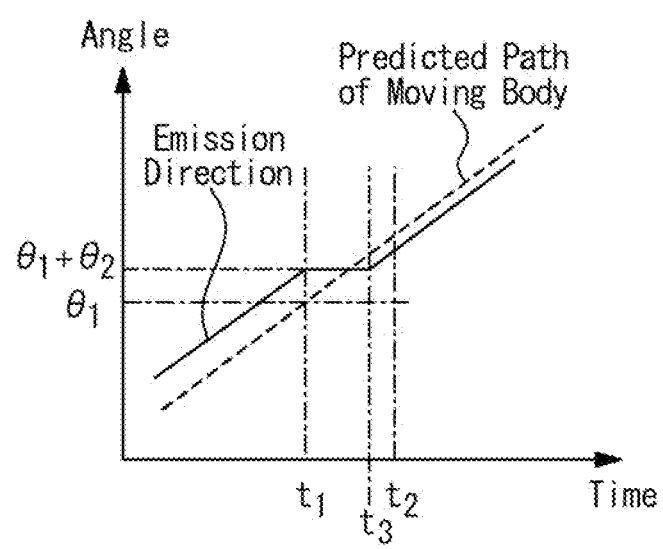
FIG. 8 is a diagram for illustrating the emission direction of output light emitted by a laser tracking device, according to one embodiment.

When the tracking start condition is satisfied, at step S120 shown in FIG. 4A, the controller 152 drives the adjustment device 110 to adjust the emission direction of the output light 10. For example, when the tracking start condition is satisfied, the controller 152 drives the adjustment device 110 such that the emission direction of the output light 10 is kept at a predetermined angle θ. More specifically, as shown in FIG. 7, the controller 152 controls, before the tracking start time $t_1$ at which the tracking start condition is satisfied, the adjustment device 110 such that the adjustment angle with which the adjustment device 110 adjusts the emission direction of the output light 10 is a second angle $\theta_2$. The second angle $\theta_2$ is the maximum value of the adjustment angle adjustable by the adjustment device 110. When the tracking start time $t_1$ has been reached, the controller 152 rotates the adjustment device 110 to a direction to reduce the angle θ. The actuator 112 of the adjustment device 110 rotates the optical element 111 based on the control signal from the controller 152 to offset the modification in the emission direction of the output light 10 caused by the rotation of the telescope 130. Accordingly, as shown in FIG. 8, the emission direction of the output light 10 is kept unchanged for a predetermined time duration after the tracking start time $t_1$.

At step S130 shown in FIG. 4A, the controller 152 starts emission of the initial light 11 by driving the laser oscillator 100. The initial light 11 is for example, pulse laser light with a specified wavelength. As a result, the output light 10 is emitted in a specified direction, more specifically, to the angle of the sum of $\theta_1$ and $\theta_2$ for the predetermined time after the tracking start time $t_1$.

At step S140 shown in FIG. 4B, the controller 152 determines whether the moving body 3 is detected. More specifically, the light receiving device 140 measures a photon count based on the light wave received by the telescope 130. The controller 152 determines, based on the measured photon count, whether the light wave received by the telescope 130 includes the reflected light 20 from the moving body 3. The controller 152 performs the process of step S150 when determining that the light wave received by the telescope 130 does not include the reflected light 20. The controller 152 performs the process of step S160 when determining that the light wave received by the telescope 130 includes the reflected light 20.

At step S150, the controller 152 determines whether a predetermined time has elapsed after the tracking start condition is satisfied. When the predetermined time has not elapsed after the tracking start time $t_1$, the controller 152 returns to the process of step S140 to continue the detection of the moving body 3. When the predetermined time has elapsed after the tracking start time $t_1$, the controller 152 determines that it is impossible to detect the moving body 3 and terminates the tracking process, stopping the laser oscillator 100, the drive device 170, and the like. For example, as shown in FIG. 7, the predetermined time is the time until the adjustment angle by the adjustment device 110 reaches a third angle $\theta_3$, that is, the time between the tracking start time $t_1$ and a tracking limit time $t_2$. The third angle $\theta_3$ is, for example, the minimum value of the adjustment angle adjustable by the adjustment device 110.

When detecting the moving body 3, at step S160 shown in FIG. 4B, the controller 152 calculates the error between the position of the moving body 3 and the predicted path of the moving body 3 based on the time when the moving body 3 is detected. For example, the controller 152 calculates the direction of the moving body 3 with respect to the laser tracking device 1 based on the emission direction of the output light 10 at the time when the moving body 3 is detected. Further, the controller 152 calculates the distance from the laser tracking device 1 to the moving body 3 based on the time when the moving body 3 is detected (for example, the time when the reflected light 20 is received) and the time when the output light 10 is emitted. This allows the controller 152 to calculate the precise position of the moving body 3. Further, the controller 152 calculates the error between the predicted path of the moving body 3 and the current position of the moving body 3 based on the time when the reflected light 20 is received or the time when the output light 10 is emitted.

At step S170, the controller 152 drives the adjustment device 110 based on the calculated error. More specifically, the controller 152 calculates an adjustment angle of the adjustment device 110 based on the calculated error such that the emission direction of the output light 10 is directed towards the moving body 3 and sets the adjustment device 110 to the calculated adjustment angle. As shown in FIG. 7, after the detection time $t_3$ when the moving body 3 is detected, the controller 152 maintains the adjustment error of the adjustment device 110 in accordance with the calculated adjustment error. The drive device 170 rotates the telescope 130 along the predicted path of the moving body 3, and the adjustment device 110 is set to the adjustment angle in accordance with the error. As such, as shown in FIG. 8, the controller 152 drives the telescope 130 along the predicted path of the moving body 3 to track the moving body 3.

At step S180 shown in FIG. 4B, the controller 152 determines whether an end condition to terminate the tracking of the moving body 3 is satisfied. When determining the end condition is not satisfied, the controller 152 repeats the process of step S180 until the end condition is satisfied. When determining that the end condition is satisfied, the controller 152 stops the tracking of the moving body 3, stopping respective devices of the laser tracking device 1, including the laser oscillator 100, the adjustment device 110, the drive device 170, and the like. For example, the end condition may be that a predetermined time has elapsed after the start of the tracking. When the predetermined time has elapsed after the start of the tracking, for example, when the predetermined time has elapsed from the detection time $t_3$, the controller 152 determines that the end condition is satisfied and stops the respective devices of the laser tracking device 1.

It is noted that, at step S180, the controller 152 measures the distance from the laser tracking device 1 to the moving body 3 based on the time duration from the emission of the initial light 11 by the laser oscillator 100 to the reception of the splitted light 22 by the light receiving device 140. Further, the controller 152 calculates the direction of the moving body 3 with respect to the laser tracking device 1 based on the axial direction of the telescope 130 controlled by the drive device 170 and the adjustment angle of the emission direction of the output light 10 controlled by the adjustment device 110. The controller 152 determines the position of the moving body 3 based on the measured distance to the moving body 3 and the direction of the moving body 3. In this way, the laser tracking device 1 tracks the moving body 3.

Variation Example 1 of Embodiment 1

Figure 9:
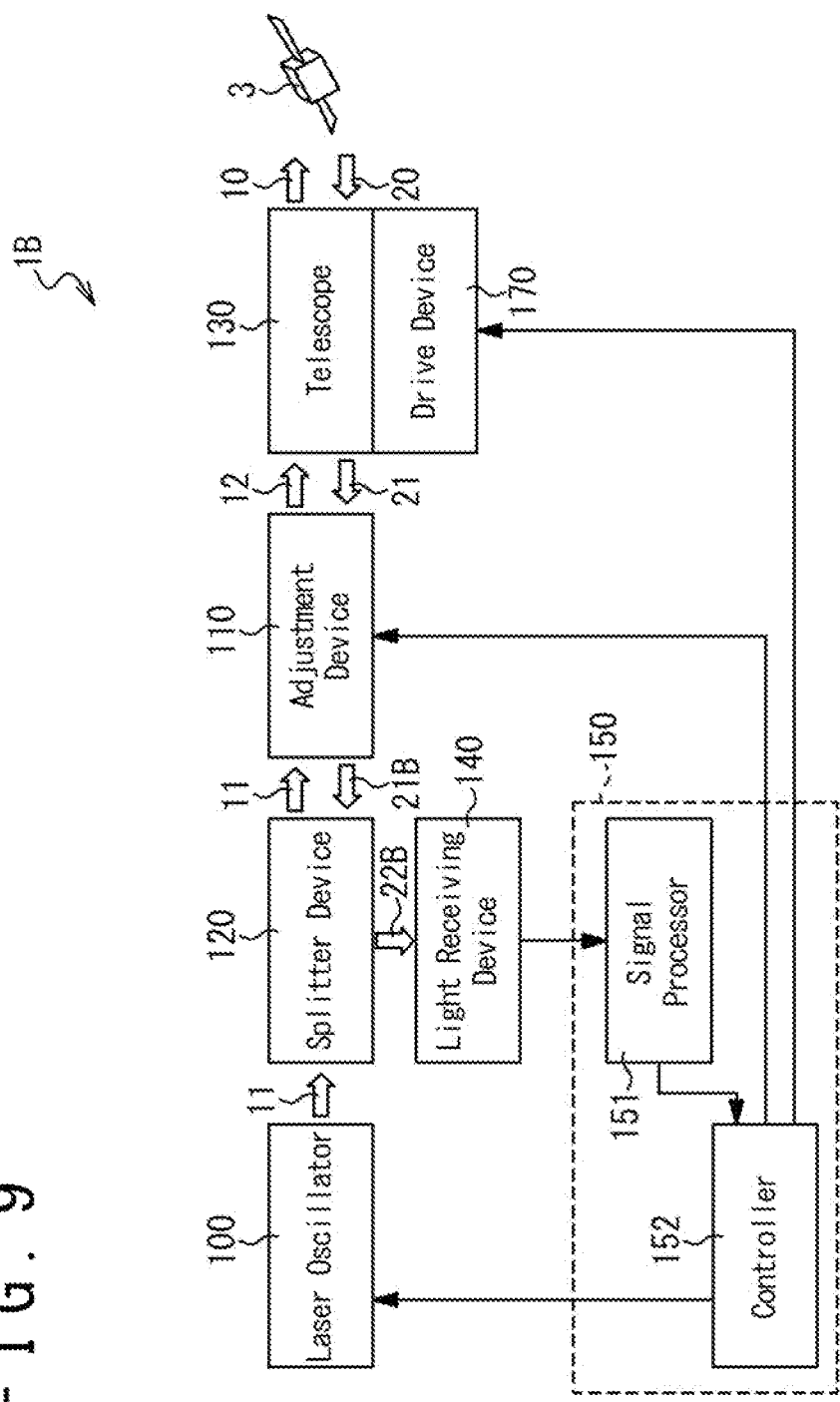
FIG. 9 is a configuration diagram of a laser tracking device, according to one embodiment.

As shown in FIG. 9, the adjustment device 110 of the laser tracking device 1B may adjust the travel direction of the reflected light 20 and emit to the light receiving device 140 the reflected light 20 with the travel direction thereof adjusted. The laser tracking device 1B is allowed to use a light receiving device 140 with a narrow field of view since the travel direction of the light wave received by the light receiving device 140 is adjusted by the adjustment device 110. In this case, the adjustment device 110 is disposed between the telescope 130 and the splitter device 120 in terms of the optical path.

When the output light 10 is to be emitted, the laser oscillator 100 emits the initial light 11 to the splitter device 120. The splitter device 120 emits the initial light 11 to guide the initial light 11 to the adjustment device 110. The adjustment device 110 adjusts the travel direction of the initial light 11 emitted from the splitter device 120 and guides the initial light 11 to the telescope 130 as the adjusted light 12. The telescope 130 emits the adjusted light 12 as the output light 10 in the axial direction of the telescope 130. Detailed configurations of the respective devices are as described in relation to Embodiment 1, and accordingly no description thereof is given.

When receiving the reflected light 20, the telescope 130 outputs, as the acquired light 21, the reflected light 20 that reaches one end thereof to the adjustment device 110. The adjustment device 110 adjusts the travel direction of the acquired light 21. The acquired light 21B with the travel direction thereof adjusted is emitted to the splitter device 120. The splitter device 120 outputs the acquired light 21B such that the acquired light 21B is guided to the light receiving device 140 as splitted light 22B. The light receiving device 140 measures a photon count based on the splitted light 22B received from the splitter device 120. Detailed configurations of the respective devices are as described in Embodiment 1, and accordingly no description thereof is given.

The operation of the laser tracking device 1B is also as described in relation to Embodiment 1, and accordingly no description thereof is given.

Variation Example 2 of Embodiment 1

Figure 10:
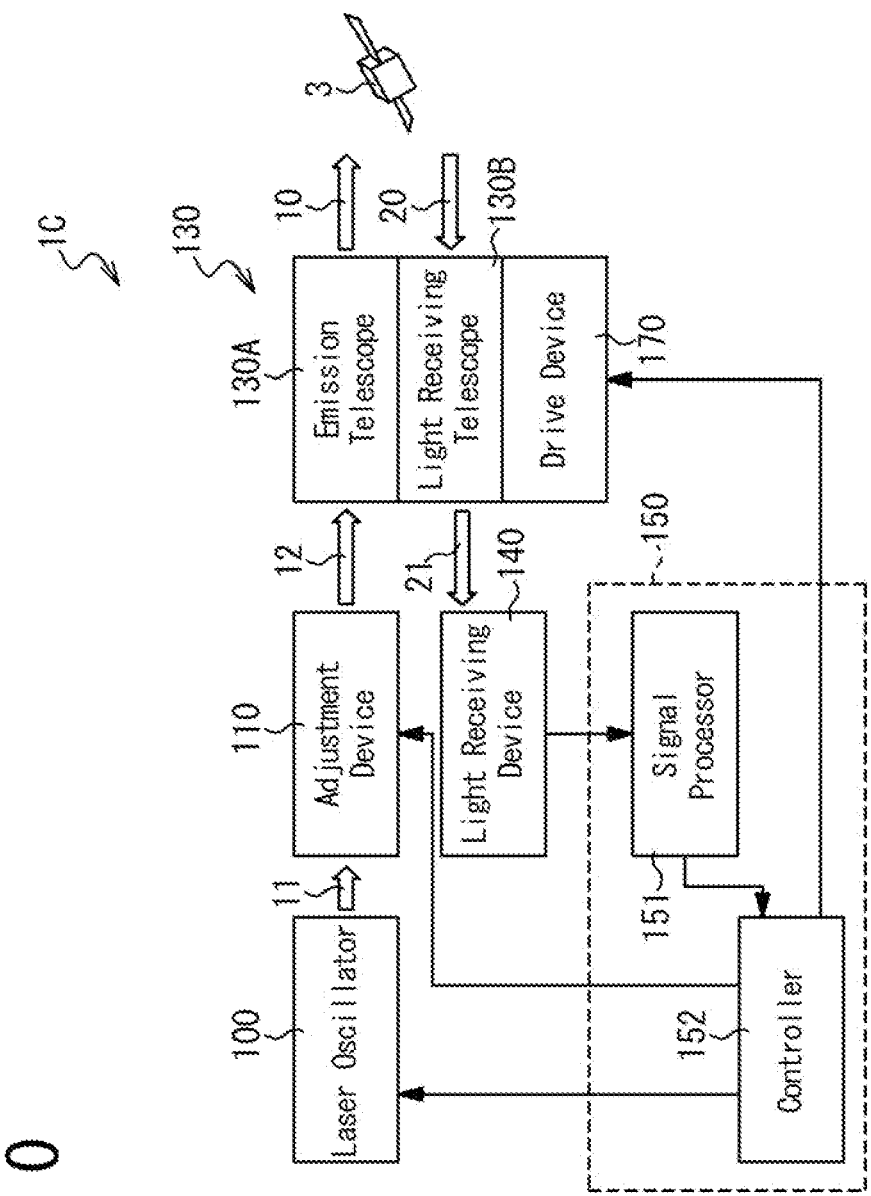
FIG. 10 is a configuration diagram of a laser tracking device, according to one embodiment.

As shown in FIG. 10, the telescope 130 of the laser tracking device 1C may include an emission telescope 130A and a light receiving telescope 130B. The emission telescope 130A is configured to emit the output light 10 and the light receiving telescope 130B is configured to receive the reflected light 20. The light receiving telescope 130B is relatively fixed to the emission telescope 130A and the drive device 170 rotates the emission telescope 130A and the light receiving telescope 130B. Since the reflected light 20 is separated from the light axis of the output light 10 in the laser tracking device 1C, the splitter device 120 is omitted.

When the output light 10 is to be emitted, the laser oscillator 100 emits the initial light 11 to the adjustment device 110. The adjustment device 110 adjusts the travel direction of the initial light 11 emitted from the laser oscillator 100 and guides the initial light 11 to the emission telescope 130A as the adjusted light 12. The emission telescope 130A emits the adjusted light 12 as the output light 10 in the axial direction of the emission telescope 130A. The detailed configuration of the emission telescope 130A is similar to the telescope 130 of Embodiment 1 and detailed configurations of other respective devices are also as described in relation to Embodiment 1. Accordingly, no descriptions thereof are given.

When receiving the reflected light 20, the light receiving telescope 130B outputs, as the acquired light 21, the reflected light 20 that reaches one end thereof to the light receiving device 140. The light receiving device 140 measures a photon count based on the acquired light 21 received from the light receiving telescope 130B. The detailed configuration of the light receiving telescope 130B is similar to the telescope 130 of Embodiment 1 and detailed configurations of other respective devices are also as described in relation to Embodiment 1. Accordingly, no descriptions thereof are given.

The operation of the laser tracking device 1C is also as described in relation to Embodiment 1, and accordingly no description thereof is given.

Variation Example 3 of Embodiment 1

Figure 11:
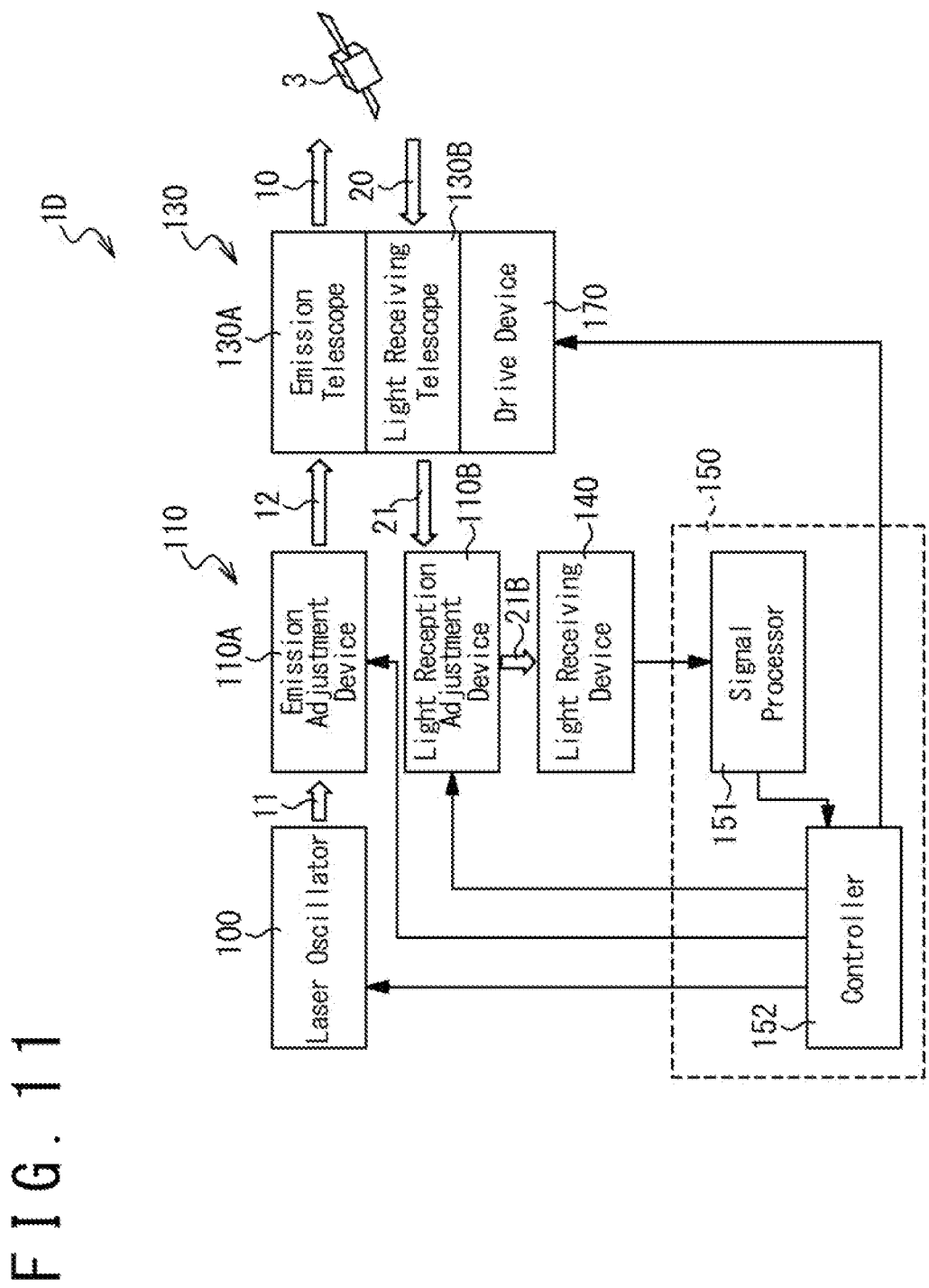
FIG. 11 is a configuration diagram of a laser tracking device, according to one embodiment.

As shown in FIG. 11, the telescope 130 of the laser tracking device 1D may include an emission telescope 130A and a light receiving telescope 130B while the adjustment device 110 may include an emission adjustment device 110A and a light reception adjustment device 110B. The emission adjustment device 110A adjusts the output direction of the output light 10 similarly to the adjustment device 110 of Embodiment 1. The light reception adjustment device 110B adjusts the travel direction of the reflected light 20 and emits the reflected light 20 with the travel direction thereof adjusted to the light receiving device 140. The laser tracking device 1D is allowed to use a light receiving device 140 with a narrow field of view since the travel direction of light wave received by the light receiving device 140 is adjusted by the adjustment device 110. Further, since the reflected light 20 is separated from the light axis of the output light 10 in the laser tracking device 1D, the splitter device 120 is omitted.

When the output light 10 is to be emitted, the laser oscillator 100 emits the initial light 11 to the emission adjustment device 110A. The adjustment device 110 adjusts the travel direction of the initial light 11 emitted from the laser oscillator 100 and guides the initial light 11 to the emission telescope 130A as the adjusted light 12. The emission telescope 130A emits the adjusted light 12 as the output light 10 in the axial direction of the emission telescope 130A. The detailed configuration of the emission adjustment device 110A is similar to the adjustment device 110 of Embodiment 2 and detailed configurations of other respective devices are as described in relation to Variation Example 2. Accordingly, no descriptions thereof are given.

When receiving the reflected light 20, the light receiving telescope 130B outputs, as the acquired light 21, the reflected light 20 that reaches one end thereof to the light reception adjustment device 110B. The light reception adjustment device 110B adjusts the travel direction of the acquired light 21 and outputs the acquired light 21 to the light receiving device 140 as the acquired light 21B. The light receiving device 140 measures a photon count based on the acquired light 21B received from the light reception adjustment device 110B. The detailed configuration of the light reception adjustment device 110B is similar to the adjustment device 110 of Embodiment 2 and detailed configurations of other respective devices are as described in relation to Variation Example 2. Accordingly, no descriptions thereof are given.

The operation of the laser tracking device 1D is also as described in relation to Embodiment 1, and accordingly no description thereof is given.

Variation Example 4 of Embodiment 1

Figure 12:
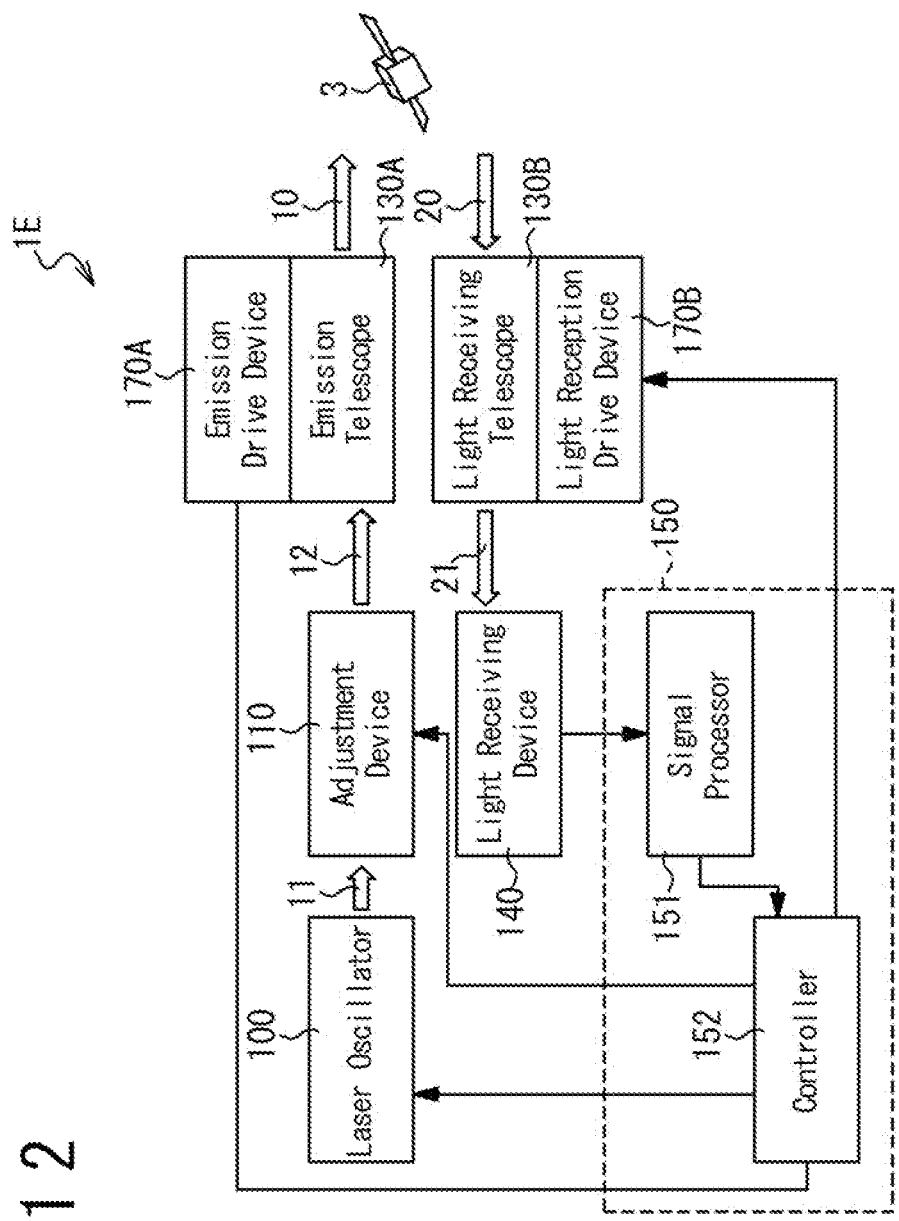
FIG. 12 is a configuration diagram of a laser tracking device, according to one embodiment.

As shown in FIG. 12, the telescope 130 of the laser tracking device 1E may include an emission telescope 130A and a light receiving telescope 130B while the drive device 170 may include an emission drive device 170A and a light reception drive device 170B. The emission telescope 130A is configured to emit the output light 10 and the light receiving telescope 130B is configured to receive the reflected light 20. The emission drive device 170A is configured to rotate the emission telescope 130A to direct the axial direction of the emission telescope 130A towards the moving body 3 while the light reception drive device 170B is configured to rotate the light receiving telescope 130B to direct the axial direction of the light receiving telescope 130B towards the moving body 3.

The emission telescope 130A is configured to rotate independently of the light receiving telescope 130B, which allows the emission telescope 130A to be disposed apart from the light receiving telescope 130B. Further, since the reflected light 20 is separated from the light axis of the output light 10 in the laser tracking device 1E, the splitter device 120 is omitted.

When the output light 10 is to be emitted, the laser oscillator 100 emits the initial light 11 to the adjustment device 110. The adjustment device 110 adjusts the travel direction of the initial light 11 emitted from the laser oscillator 100 and guides the initial light 11 to the emission telescope 130A as the adjusted light 12. The emission telescope 130A emits the adjusted light 12 as the output light 10 in the axial direction of the emission telescope 130A. Detailed configurations of respective devices are as described in relation to Variation Example 2, and accordingly no description thereof is given.

When receiving the reflected light 20, the light receiving telescope 130B outputs, as the acquired light 21, the reflected light 20 that reaches one end thereof to the light receiving device 140. The light receiving device 140 measures a photon count based on the acquired light 21 received from the light receiving telescope 130B. Detailed configurations of respective devices are as described in relation to Variation Example 2, and accordingly no description thereof is given.

The operation of the laser tracking device 1E is as described in relation to Embodiment 1, and accordingly no description thereof is given.

Variation Example 5 of Embodiment 1

Figure 13:
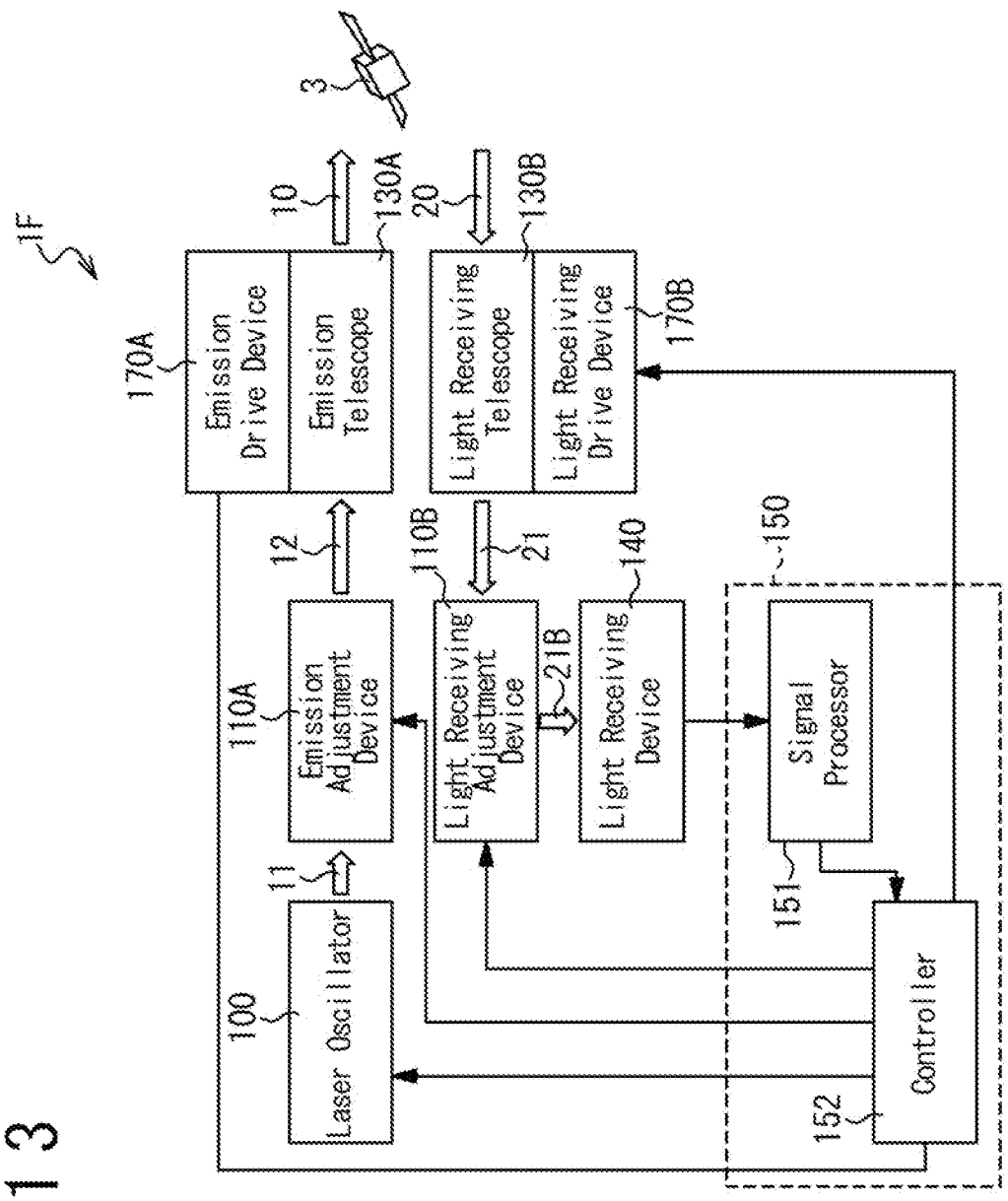
FIG. 13 is a configuration diagram of a laser tracking device, according to one embodiment.

As shown in FIG. 13, the telescope 130 of the laser tracking device 1F may include an emission telescope 130A and a light receiving telescope 130B while the drive device 170 may include an emission drive device 170A and a light reception drive device 170B. Further, the adjustment device 110 may include an emission adjustment device 110A and a light reception adjustment device 110B. The emission adjustment device 110A adjusts the output direction of the output light 10 similarly to the emission adjustment device 110A of Variation Example 3. The light reception adjustment device 110B adjusts the travel direction of the reflected light 20 and emits the reflected light 20 with the travel direction thereof adjusted to the light receiving device 140, similarly to the light reception adjustment device 110B of Variation Example 3. The detailed configurations of the telescope 130 and the drive device 170 are as described in relation to Variation Example 4, and accordingly no descriptions thereof are given.

The laser tracking device 1F is allowed to use a light receiving device 140 with a narrow field of view since the travel direction of light wave received by the light receiving device 140 is adjusted by the adjustment device 110. The emission telescope 130A is configured to rotate independently of the light receiving telescope 130B, which allows the emission telescope 130A to be disposed apart from the light receiving telescope 130B. Further, since the reflected light 20 is separated from the light axis of the output light 10 in the laser tracking device 1F, the splitter device 120 is omitted.

When the output light 10 is to be emitted, the laser oscillator 100 emits the initial light 11 to the emission adjustment device 110A The emission adjustment device 110A adjusts the travel direction of the initial light 11 emitted from the laser oscillator 100 and guides the initial light 11 to the emission telescope 130A as the adjusted light 12. The emission telescope 130A emits the adjusted light 12 as the output light 10 in the axial direction of the emission telescope 130A. The emission adjustment device 110A is as described in relation to Variation Example 3 and detailed configurations of other respective devices are as described in relation to Variation Example 4. Accordingly, no descriptions thereof are given.

When receiving the reflected light 20, the light receiving telescope 130B outputs, as the acquired light 21, the reflected light 20 that reaches one end thereof to the light reception adjustment device 110B. The light reception adjustment device 110B adjusts the travel direction of the acquired light 21 and outputs the acquired light 21 to the light receiving device 140 as acquired light 21B. The light receiving device 140 measures a photon count based on the acquired light 21B received from the light reception adjustment device 110B. The detailed configuration of the light reception adjustment device 110B is as described in relation to Variation Example 3 and detailed configurations of other respective devices are as described in relation to Variation Example 4. Accordingly, no descriptions thereof are given.

The operation of the laser tracking device 1F is as described in relation to Embodiment 1, and accordingly no description thereof is given.

Embodiment 2

Figure 14:
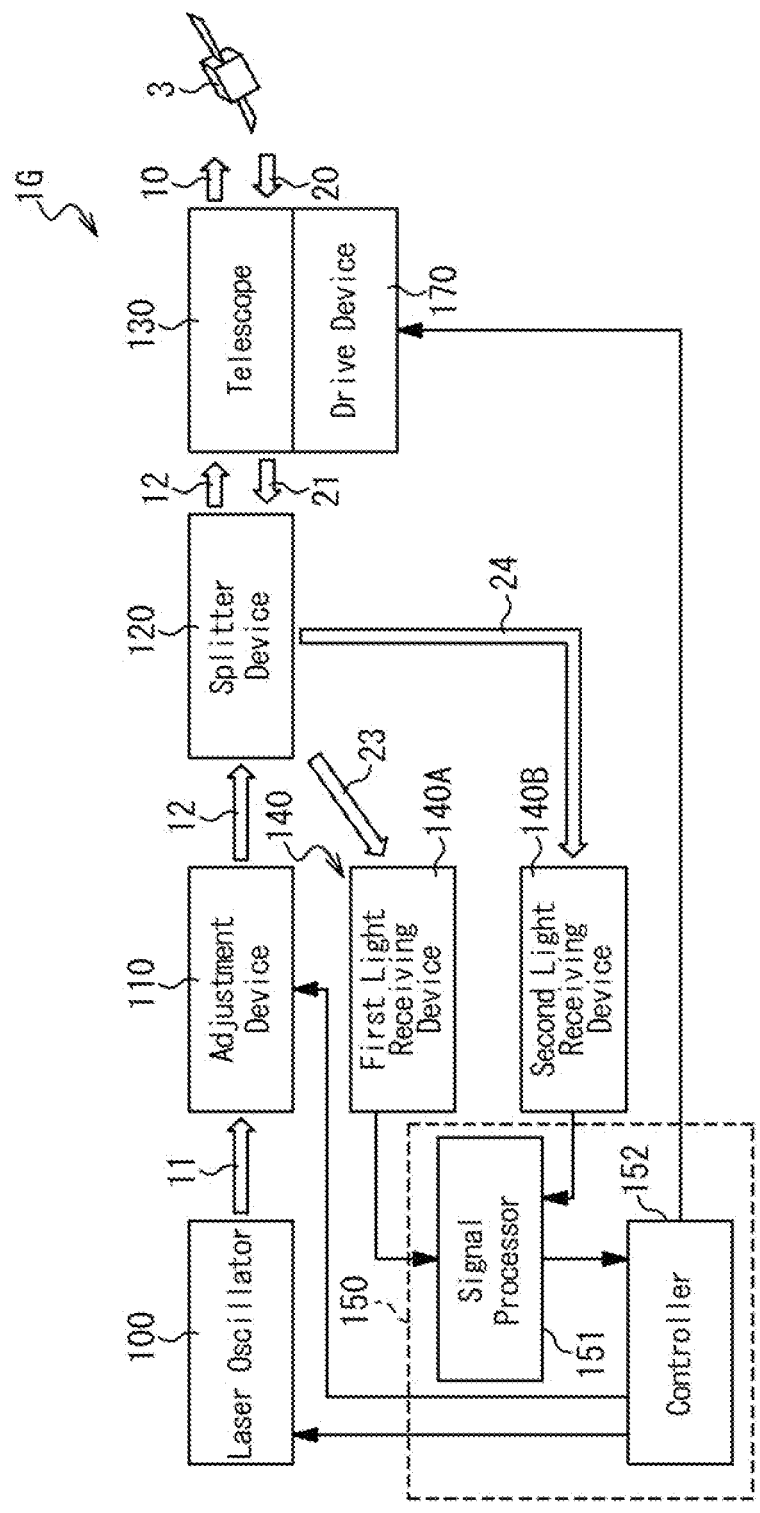
FIG. 14 is a configuration diagram of a laser tracking device, according to one embodiment.

As shown in FIG. 14, the light receiving device 140 of the laser tracking device 1G may include a first light receiving device 140A and a second light receiving device 140B. In this case, the splitter device 120 splits the acquired light 21 received from the telescope 130 into first splitted light 23 to be guided to the first light receiving device 140A and second splitted light 24 to be guided to the second light receiving device 140B. The splitter device 120 includes, for example, a beam splitter that splits the acquired light 21 into the first splitted light 23 and the second splitted light 24.

The first light receiving device 140A receives the reflected light 20, which is produced by the output light 10 outputted from the telescope 130 being reflected by the moving body 3. Meanwhile, the second light receiving device 140B receives light wave emitted from the moving body 3, for example, reflected light of the sunlight.

To receive the reflected light 20 of the output light 10, the first light receiving device 140A may include an optical filter, such as a band filter, that allows passage of light in a band that includes the wavelength band of the output light 10. The first light receiving device 140A measures a photon count based on the reflected light 20 of the output light 10.

To receive light wave other than the reflected light 20 of the output light 10, the second light receiving device 140B may include an optical filter, such as a long pass filter, a short pass filter or the like, that cuts off light of the wavelength band of the output light 10. The second light receiving device 140B measures a photon count based on light wave emitted from the moving body 3, such as reflected light of the sunlight.

The signal processor 151 detects the moving body 3 based on the photon count measured by the first light receiving device 140A and the photon count measured by the second light receiving device 140B. The signal processor 151 determines whether any of the light wave received by the first light receiving device 140A and the light wave received by the second light receiving device 140B includes reflected light from the moving body 3. When the received light wave includes the reflected light, the signal processor 151 outputs to the controller 152 a detection signal that represents that the moving body 3 is detected.

By the light receiving device 140 receiving light wave emitted from the moving body 3 in addition to the reflected light 20 of the output light 10, the signal processor 151 can detect the moving body 3 with high probability. For example, let pulse laser light be emitted as the output light 10. Even in the case when the moving body 3 crosses the emitting line of the output light 10 while emission of the output light 10 is halted, the signal processor 151 can detect the moving body 3 by receiving the reflected light of the sunlight. Further, even in the case when the emission direction of the output light 10 is misaligned from the actual position of the moving body 3 due to an error in the predicted path of the moving body 3 and/or an error in the emission direction, the signal processor 151 can detect the moving body 3 by receiving the reflected light of the sunlight.

Figure 15A:
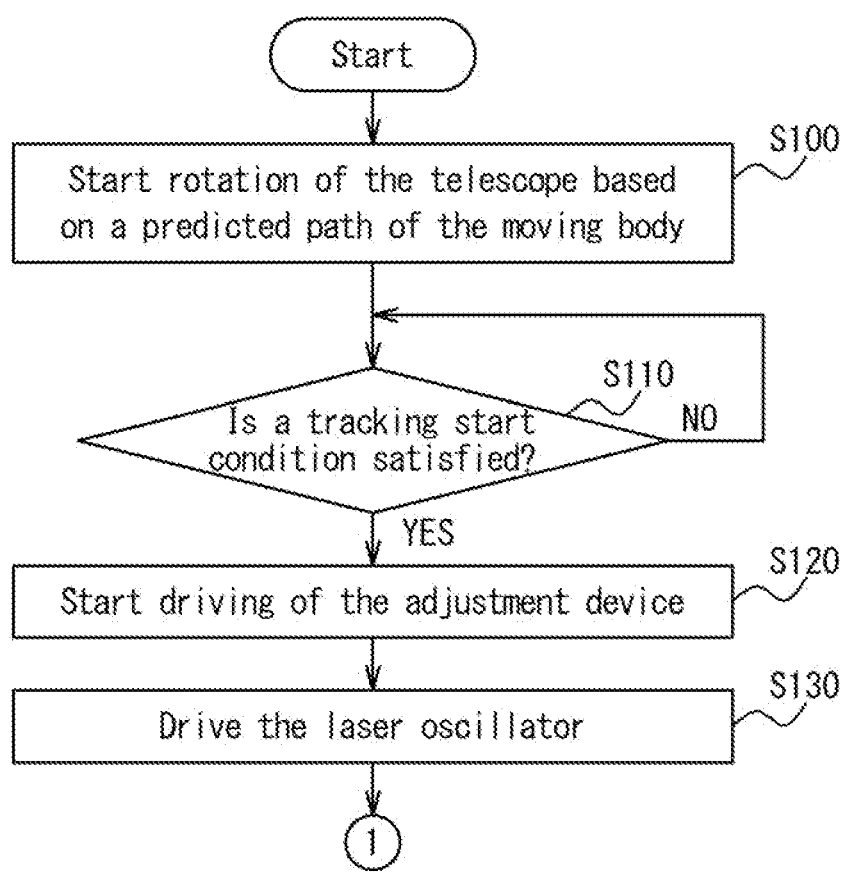
FIG. 15A is a flowchart showing the operation of a laser tracking device, according to one embodiment.
Figure 15B:
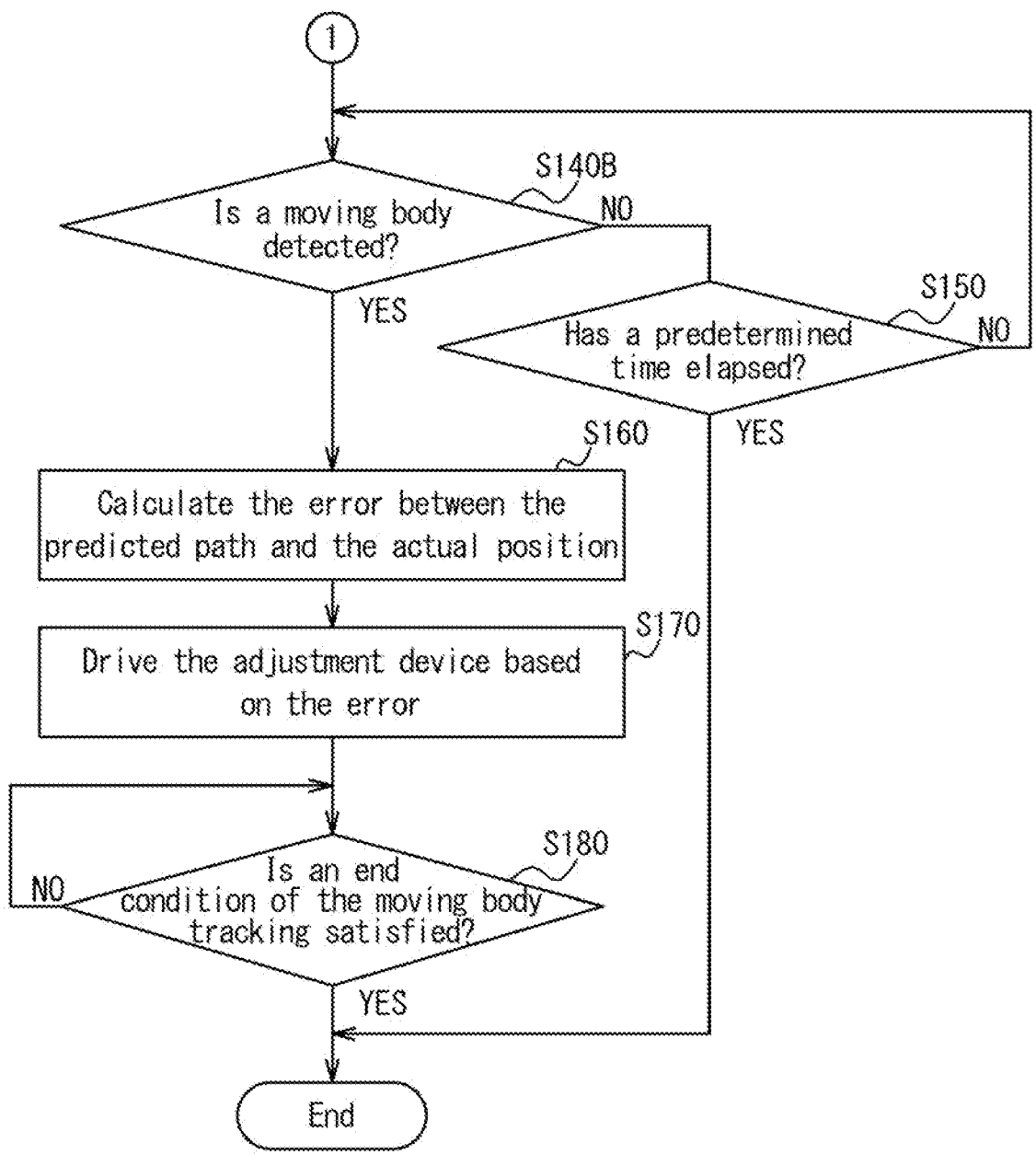
FIG. 15B is a flowchart showing the operation of a laser tracking device, according to one embodiment.

The configuration of the rest is as described in relation to Embodiment 1, and accordingly no description thereof is given. 100711 (Operation of Laser Tracking Device) The laser tracking device 1G tracks the moving body 3 through the procedure shown in FIGS. 15A and 15B. When tracking the moving body 3, the laser tracking device 1G manually or automatically starts the procedure shown in FIGS. 15A and 15B. The processes of steps S100 to S130 are as described in relation to Embodiment 1, and accordingly no description thereof is given.

At step S140B of FIG. 15B, the controller 152 determines whether the moving body 3 is detected. More specifically, the first light receiving device 140A measures a first photon count based on the first splitted light 23 that includes the reflected light 20 of the output light 10. Further, the second light receiving device 140B measures a second photon count based on the second splitted light 24 that includes reflected light of the sunlight and the like. The controller 152 determines, based on the measured first photon count and second photon count, whether at least one of the first splitted light 23 and the second splitted light 24 includes reflected light from the moving body 3. When determining that none of the first splitted light 23 and the second splitted light 24 includes reflected light from the moving body 3, the controller 152 performs the process of step S150. When determining that at least one of the first splitted light 23 and the second splitted light 24 includes reflected light from the moving body 3, the controller 152 performs the process of step S160.

The processes of steps S150 to S180 are as described in relation to Embodiment 1, and accordingly no description thereof is given.

Variation Example of Embodiment 2

Figure 16:
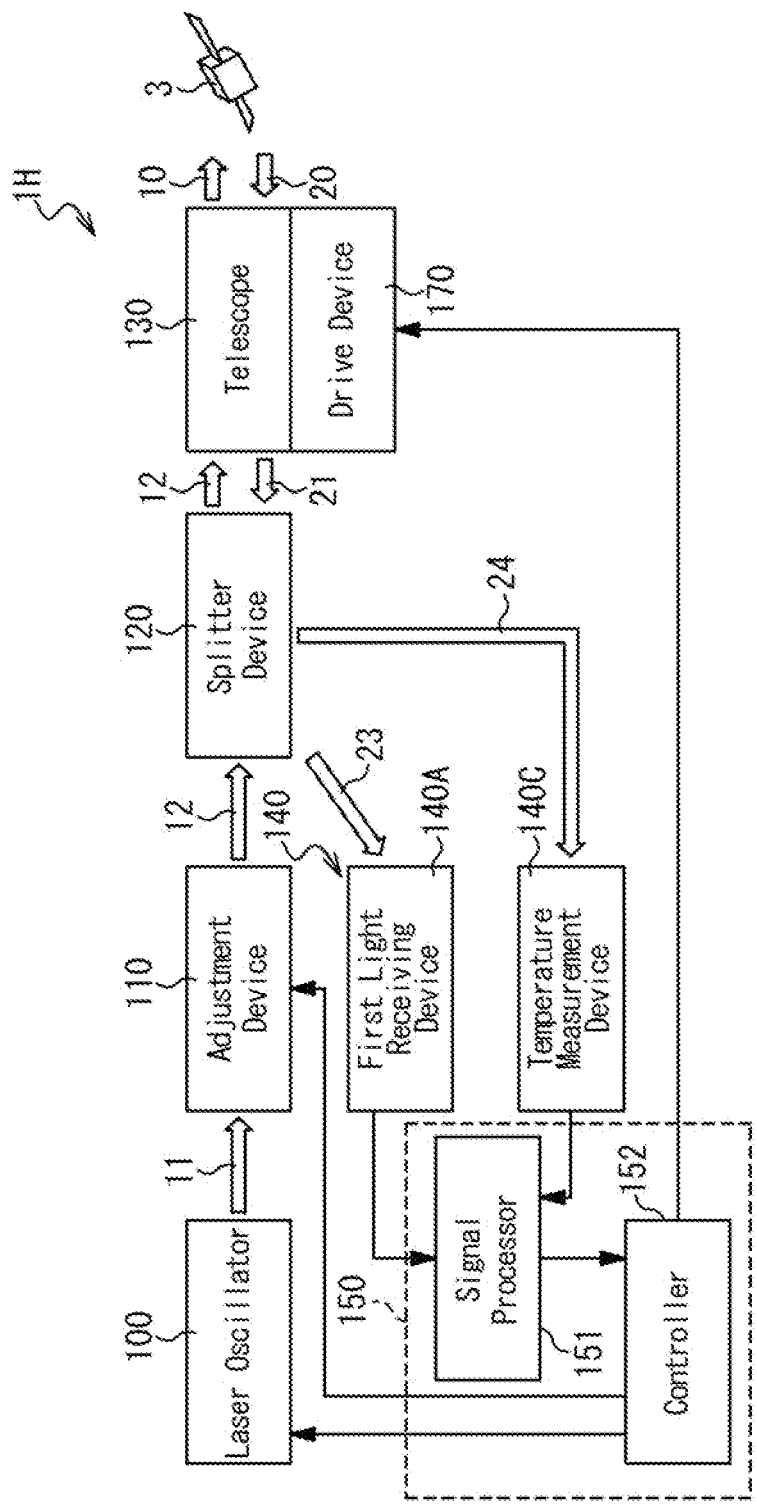
FIG. 16 is a configuration diagram of a laser tracking device, according to one embodiment.

As shown in FIG. 16, the light receiving device 140 of the laser tracking device 1H may include a temperature measurement device 140C that measures the temperature of an object located in the axial direction of the telescope 130. For example, the temperature measurement device 140C measures the temperature of the object located in the axial direction of the telescope 130 based on an infrared ray included in the second splitted light 24. In this case, the temperature measurement device 140C generates image data that represents the temperatures in various directions based on the second splitted light 24. It is noted that the temperature measurement device 140C may be any temperature measurement device that measures the temperature of an object, not limited to the configuration that measures the temperature based on an infrared ray.

The signal processor 151 detects the moving body 3 based on the photon count measured by the first light receiving device 140A and the image data generated by the temperature measurement device 140C. The signal processor 151 determines, based on the photon count measured by the first light receiving device 140A, whether the first splitted light 23 received by the first light receiving device 140A includes the reflected light 20 from the moving body 3. Further, the signal processor 151 determines, based on the image data generated by the temperature measurement device 140C, whether the moving body 3 exists within the range within which the temperature measurement device 140C performs the measurement. More specifically, the signal processor 151 determines whether the image data generated by the temperature measurement device 140C to represent the temperatures includes a region that represents the temperature of the moving body 3. When the first splitted light 23 received by the first light receiving device 140A includes the reflected light 20 or when the image data of the temperature measurement device 140C includes the region of the moving body 3, the signal processor 151 outputs to the controller 152 a detection signal that represents that the moving body 3 is detected.

Since the light receiving device 140 detects the temperature of the moving body 3, the signal processor 151 can detect the moving body 3 with high precision. Especially when the moving body 3 is a heat generating object, including a satellite with high power consumption such as a communication satellite and an optical satellite, the signal processor 151 can detect the moving body 3 with higher precision.

The configuration and operation of the rest are as described in relation to Embodiment 2, and accordingly no description thereof is given.

Embodiment 3

Figure 17:
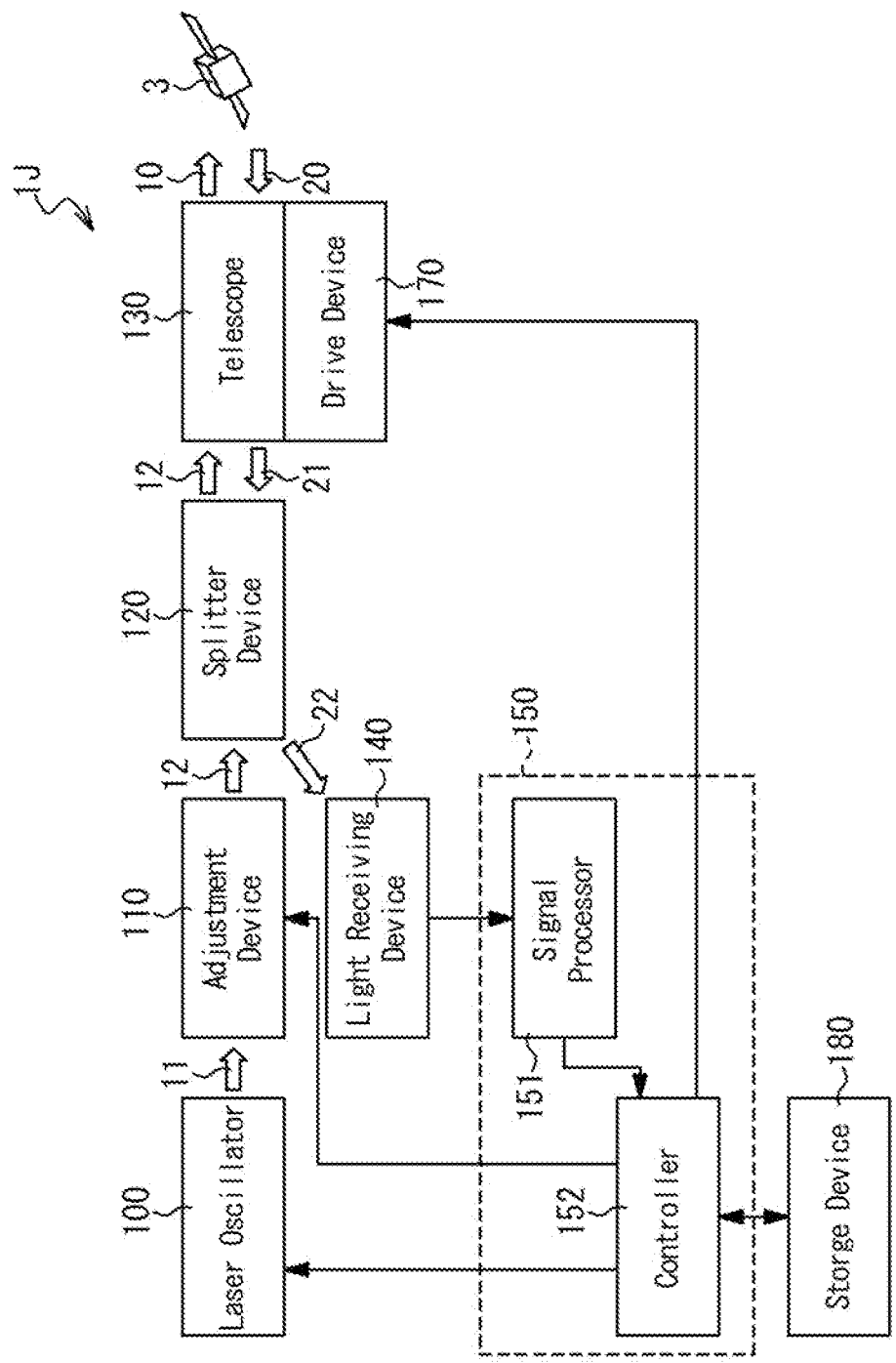
FIG. 17 is a configuration diagram of a laser tracking device, according to one embodiment.

As shown in FIG. 17, the laser tracking device 1J may include a storage device 180 for setting the second angle $\theta_2$ shown in FIG. 7. The second angle $\theta_2$ is the adjustment angle with which the adjustment device 110 adjusts the output direction of the output light 10 at the start of the tracking of the moving body 3. The storage device 180 stores parameters that influence the emission direction of the output light 10, such as the processing delay of the laser tracking device 1J, an error in the emission direction caused by a distortion of the telescope 130, errors caused by deterioration over time of various devices, and the like. The controller 152 retrieves the parameters from the storage device 180 to determine the second angle $\theta_2$. This allows the laser tracking device 1J to correct an error related to the emission direction of the output light 10. It is noted that the storage device 180 may be incorporated in the controller 152.

(Operation of Tracking Device)

Figure 18A:
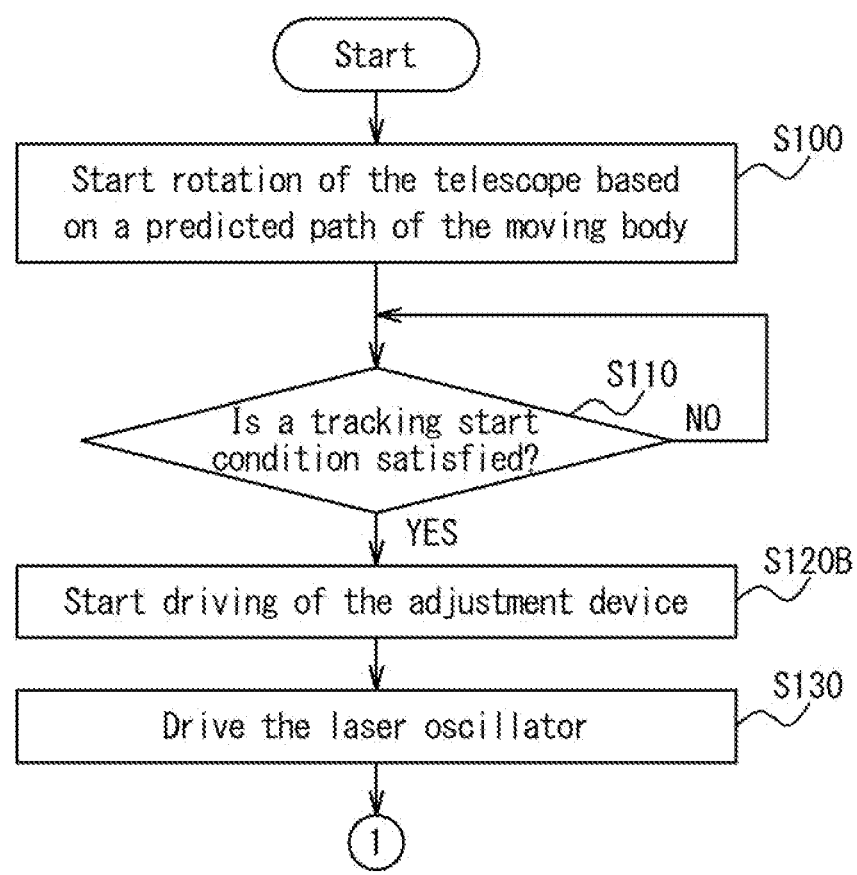
FIG. 18A is a flowchart showing the operation of a laser tracking device, according to one embodiment.
Figure 18B:
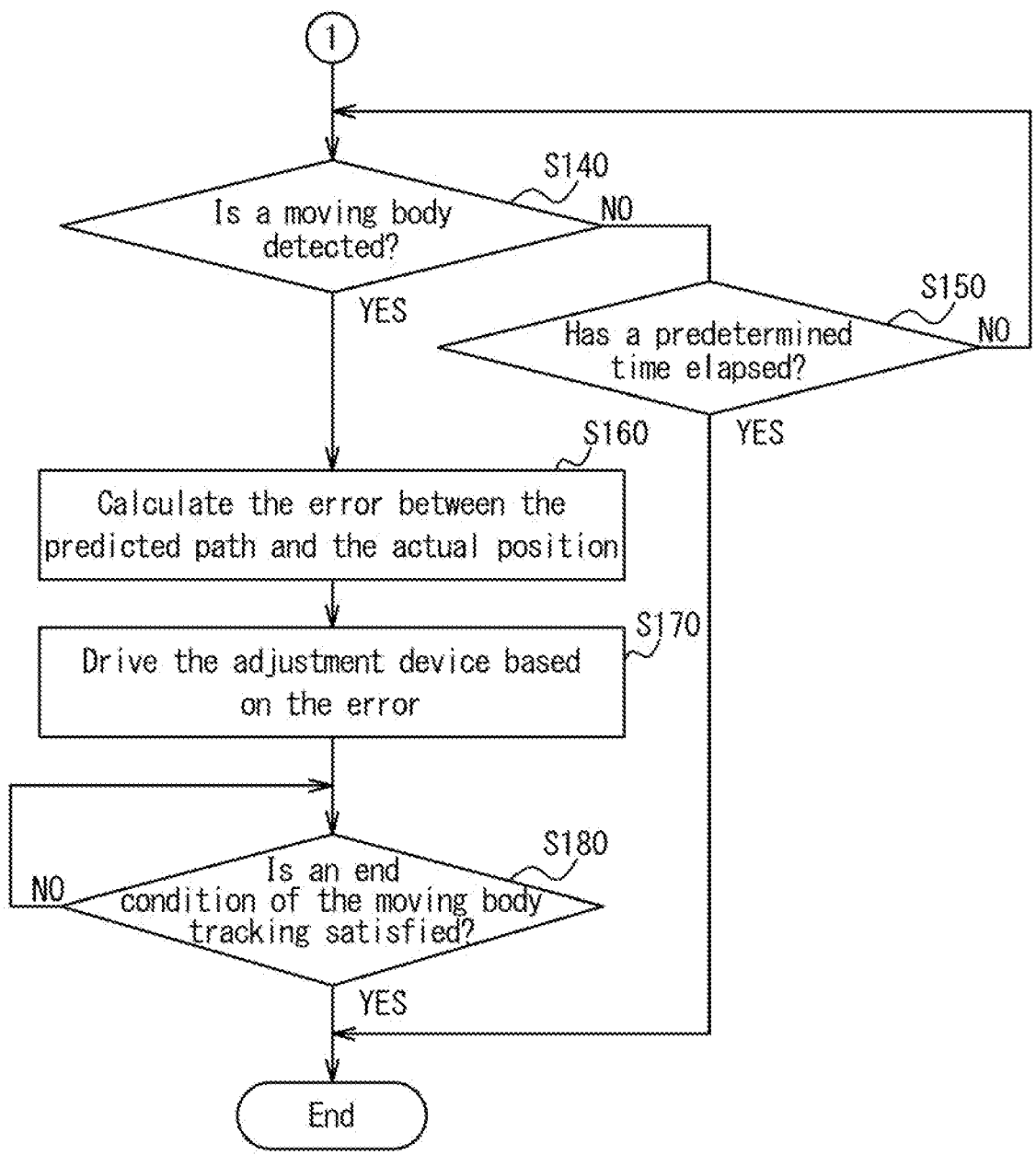
FIG. 18B is a flowchart showing the operation of a laser tracking device, according to one embodiment.

The laser tracking device 1J tracks the moving body 3 through the procedure shown in FIGS. 18A and 18B. When tracking the moving body 3, the laser tracking device 1J manually or automatically starts the procedure shown FIGS. 18A and 18B. The processes of steps S100 to S110 are as described in relation to Embodiment 1, and accordingly no description thereof is given.

At step S120B, the controller 152 drives the adjustment device 110 based on the parameters stored in the storage device 180 to adjust the emission direction of the output light 10. More specifically, the controller 152 retrieves the parameters stored in the storage device 180 and determines the second angle $\theta_2$ based on the retrieved parameters. The controller 152 drives the adjustment device 110 to set the adjustment angle of the output light 10 to the second angle $\theta_2$ thus determined.

The processes of steps S130 to S180 are as described in relation to Embodiment 1, and accordingly no description thereof is given.

Variation Example 1 of Embodiment 3

Figure 19:
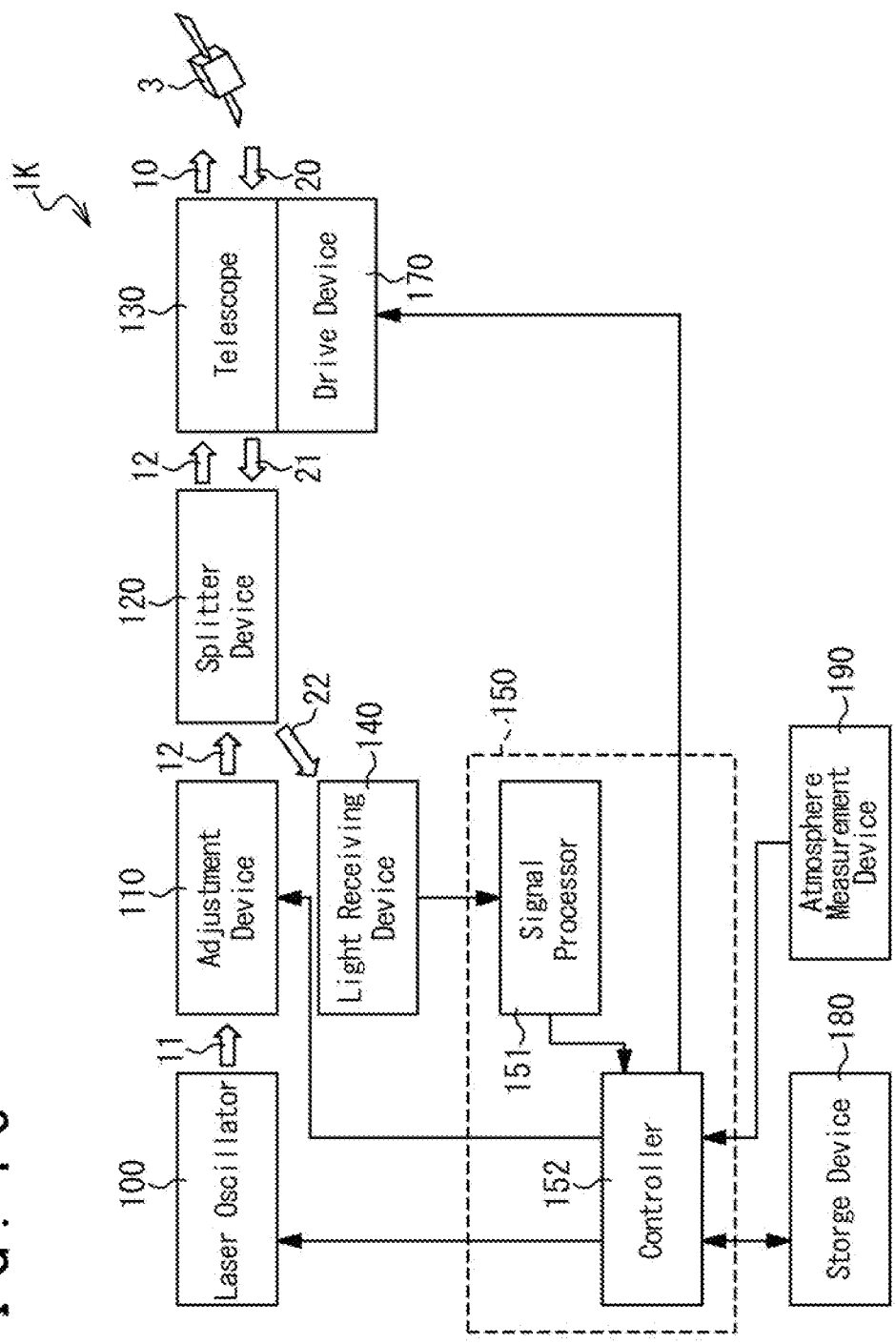
FIG. 19 is a configuration diagram of a laser tracking device, according to one embodiment.

As shown in FIG. 19, the laser tracking device 1K may further includes an atmosphere measurement device 190. The atmosphere measurement device 190 measures the state of atmosphere along the light path of the output light 10, such as the temperature, the humidity, the atmospheric pressure, the refractive index of light caused by a turbulence, and the like, and outputs the measured state of atmosphere to the controller 152. The controller 152 determines the second angle $\theta_2$ shown in FIG. 7 based on the state of atmosphere. This allows the laser tracking device 1K to correct the error related to the emission direction of the output light 10. It is noted that the atmosphere measurement device 190 may include, for example, a scintillometer that measures variations in the refractive index of light caused by a turbulence and a weather meter that measures the temperature, the humidity, the atmospheric pressure, and the like.

The laser tracking device 1K performs a similar procedure to that performed in Embodiment 3 other than step S120B shown in FIG. 18B. At step S120B, the controller 152 retrieves the parameters from the storage device 180 and acquires the state of atmosphere from the atmosphere measurement device 190. The controller 152 calculates the second angle $\theta_2$ based on the parameters and the state of atmosphere. For example, the controller 152 calculates, based on the refractive index measured by the atmosphere measurement device 190, the second angle $\theta_2$ to emit the output light 10 onto the predicted path of the moving body 3. The controller 152 drives the adjustment device 110 to set the adjustment angle of the output light 10 to the second angle $\theta_2$.

Variation Examples

Although examples have been presented in which the adjustment device 110 is disposed out of the telescope 130 in the respective embodiments, the adjustment device 110 may be disposed at any position as long as the adjustment device 110 can adjust the output direction of the output light 10, not limited to these examples. For example, the adjustment device 110 may be disposed in the telescope 130, for example, at the location of the third mirror 134 shown in FIG. 3.

Although examples have been presented in which the adjustment device 110 and the drive device 170 modify the angle between the horizontal plane 5 and the output direction of the output light 10 in the respective embodiments, the adjustment device 110 and the drive device 170 may rotate the output direction, for example, around an axis of the vertical direction, not limited to these examples.

The configuration of the telescope 130 may be arbitrarily selected, not limited to the cylindrical shape, as long as the telescope 130 can output the output light 10 towards the moving body 3. For example, the telescope 130 may be a frame formed by combining rod-shaped members that relatively fix the first mirror 132, the second mirror 133, the third mirror 134, and the fourth mirror 135.

Figure 20:
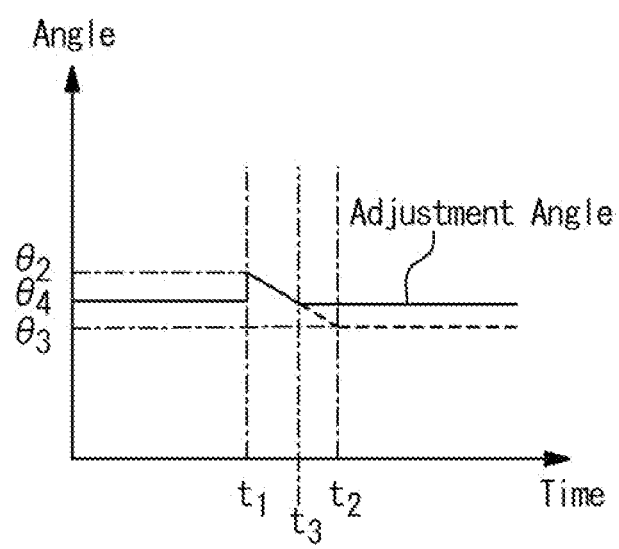
FIG. 20 is a diagram for illustrating the emission direction of output light adjusted by an adjustment device, according to one embodiment.

Although examples have been presented in which, as shown in FIG. 7, the adjustment device 110 sets the adjustment angle to the second angle $\theta_2$ from a time before the time $t_1$ when the tracking of the moving body 3 is started, the adjustment device 110 are not limited to these examples. The adjustment angle may be set to any angle before the time $t_1$ when the tracking of the moving body 3 is started, as long as the adjustment angle is set to the second angle $\theta_2$ at the time $t_1$. For example, as shown in FIG. 20, the adjustment angle may be set to a fourth angle $\theta_4$ between the second angle $\theta_2$ and the third angle $\theta_3$ before the time $t_1$. The fourth angle $\theta_4$ may be, for example, the midpoint between the second angle $\theta_2$ and the third angle $\theta_3$.

Figure 21:
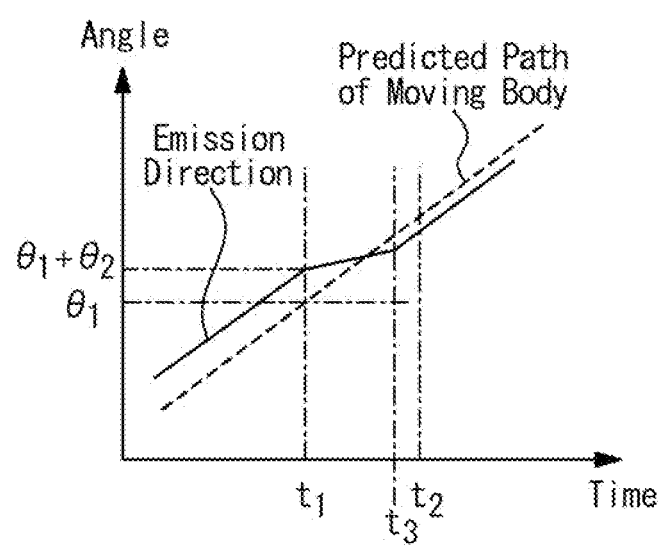
FIG. 21 is a diagram for illustrating the emission direction of output light emitted by a laser tracking device, according to one embodiment.

Although examples have been presented in which the speed at which the emission direction of the output light 10 is modified by the optical element 111 of the adjustment device 110 is equal to the speed at which the emission direction of the output light 10 is modified by the rotation of the telescope 130 after the tracking start time $t_1$ until the detection time tis when the moving body 3 is detected, the speed at which the emission direction of the output light 10 is modified by the optical element 111 is not limited to these examples. The speed at which the emission direction is modified by the optical element 111 may be arbitrarily selected as long as the speed at which the emission direction is modified by the optical element 111 is slower than or equal to the speed at which the emission direction of the output light 10 is modified by the rotation of the telescope 130. The modifying speed of the emission direction by the optical element 111 may be slower than the modifying speed of the emission direction by the rotation of the telescope 130. In this case, as shown in FIG. 21, the emission direction of the output light 10 is modified along the predicted path of moving body 3 also after the tracking start time $t_1$ until the detection time $t_3$. Since the emission direction of the output light 10 moves along the predicted path of the moving body 3, the laser tracking device 1 can detect the moving body 3 even when the velocity of the moving body 3 is high in comparison with emission intervals of the pulse laser for the output light 10.

Although examples have been presented in which the light receiving device 140, the first light receiving device 140A, and the second light receiving device 140B measures a photon count based on light wave received by the telescope 130, the light receiving device 140, the first light receiving device 140A, and the second light receiving device 140B are not limited to these examples. Any configuration may be selected for the light receiving device 140, the first light receiving device 140A, and the second light receiving device 140B as long as the light receiving device 140, the first light receiving device 140A, and the second light receiving device 140B can detect the reflected light 20 from the moving body 3. For example, the light receiving device 140, the first light receiving device 140A, and the second light receiving device 140B may be an imaging device that receives light wave to generate image data, such as a camera. In this case, the signal processor 151 determines whether the moving body 3 is pictured in the image data generated by the light receiving device 140. When the moving body 3 is pictured in the image data, the signal processor 151 determines that the light wave received by the light receiving device 140 includes reflected light from the moving body 3. Also, one of the first light receiving device 140A and the second light receiving device 140B may be an imaging device.

The above-described embodiments and variation examples are mere examples and may be modified as long as the functions are not obstructed. The configurations described in the respective embodiments and variation examples may be arbitrarily modified and/or combined as long as the functions are not obstructed.

For example, the laser tracking device may be configured by combining the configuration shown in FIG. 9 and the configuration shown in FIG. 14. In this case, in the configuration shown in FIG. 9, the light receiving device 140 includes the first light receiving device 140A and the second light receiving device 140B. Further, the storage device 180 may be omitted with respect to the configuration shown in FIG. 19. In this case, the controller 152 may determine the second angle $\theta_2$ based on the state of atmosphere informed from the atmosphere measurement device 190 without retrieving the parameters from the storage device 180.

The laser oscillator 100 may be driven at any timing as long as the laser oscillator 100 generates the output when the tracking of the moving body 3 is started. For example, the controller 152 may drive the laser oscillator 100 at step S110 in the procedure shown in FIG. 4A.

The laser tracking devices described in the respective embodiments may be figured out, for example, as follows.

A laser tracking device according to a first aspect includes an adjustment device (110), a telescope (130), and a drive device (170). The adjustment device modifies an emission direction of first light wave (10). The drive device rotates the telescope based on a predicted path of a moving body (3). The adjustment device (110) modifies the emission direction to offset modification of the emission direction caused by the rotation of the telescope from a time when a tracking start condition is satisfied until the moving body is detected.

Since the drive device rotates the telescope based on the predicted path of the moving body (3) and the adjustment device modifies the emission direction of the first light wave, it is possible to track the moving body without rapidly rotating the telescope. Further, since the adjustment device modifies the emission direction to offset the modification of the emission direction caused by the rotation of the telescope, it is possible to suppress the modification of the emission direction compared with the rotation of the telescope. This allows the laser tracking device to wait for the moving body reaching the emission direction of the output light of the laser tracking device.

A laser tracking device according to a second aspect, which is configured as the laser tracking device according to the first aspect, is configured such that the speed at which the adjustment device modifies the emission direction is lower than or equal to the speed at which the emission direction is modified by the rotation of the telescope.

A laser tracking device according to a third aspect, which is configured as the laser tracking device according to the first aspect, is configured such that the speed at which the adjustment device modifies the emission direction is equal to the speed at which the emission direction is modified by the rotation of the telescope.

A laser tracking device according to a fourth aspect, which is configured as the laser tracking device according to the first aspect, includes a light receiving device (140) and a processing device (150). The processing device (150) is configured to determine that the moving body is detected when the light receiving device (140) receives second light wave (21, 21B, 22, 22B, 23) that includes reflected light (20) from the moving body (3).

A laser tracking device according to a fifth aspect, which is configured as the laser tracking device according to the fourth aspect, includes a splitter device (120). The splitter device (120) is configured to guide the first light wave from the adjustment device to the telescope and guide the reflected light (20) from the telescope to the light receiving device.

The splitter device allows the laser tracking device to achieve the emission of the output light and the reception of the reflected light with a single telescope.

A laser tracking device according to a sixth aspect, which is configured as the laser tracking device according to the fourth aspect, includes a splitter device (120) that guides the first light wave (10) to the adjustment device. The adjustment device is configured to receive the reflected light (20) from the telescope and modify the travel direction of the received reflected light. The splitter device is configured to guide the reflected light from the adjustment device to the light receiving device.

Since the travel direction of the reflected light is modified by the adjustment device, it is possible to use a light receiving device with a narrow field of view.

In a laser tracking device according to a seventh aspect, which is configured as the laser tracking device according to the fourth aspect, the telescope (130) includes an emission telescope (130A) and a light receiving telescope (130B).

The provision of the emission telescope that emits the first light wave (10) and the light receiving telescope that receives the reflected light (20) makes it possible to omit the splitter device (120).

In a laser tracking device according to an eighth aspect, which is configured as the laser tracking device according to the seventh aspect, the adjustment device (110) is configured to incorporate an emission adjustment device (110A) and a light reception adjustment device (110B).

In a laser tracking device according to a ninth aspect, which is configured as the laser tracking device according to the seventh aspect, the drive device (170) is configured to incorporate an emission drive device (170A) and a light reception drive device (170B).

This allows the emission telescope to be disposed separately from the light receiving telescope.

In a laser tracking device according to a tenth aspect, which is configured as the laser tracking device according to the fourth aspect, the light receiving device (140) includes a first light receiving device (140A) and a second light receiving device (140B).

This allows the laser tracking device to detect the moving body with high probability.

In a laser tracking device according to an eleventh aspect, which is configured as the laser tracking device according to the tenth aspect, the second light wave (24) received by the second light receiving device does not include reflected light produced by the moving body reflecting the first light wave.

In a laser tracking device according to a twelfth aspect, which is configured as the laser tracking device according to the fourth aspect, the light receiving device (140) is configured to incorporate a first light receiving device (140A) and a temperature measurement device (140C).

This allows the laser tracking device to detect the moving body with high probability.

A laser tracking device according to a thirteenth aspect, which is configured as the laser tracking device according to the first aspect, is configured to incorporate a storage device (180) that stores a parameter that influences the emission direction.

With the adjustment device (110) modifying the emission direction of the first light wave based on the parameter stored in the storage device, the laser tracking device can correct an error in relation to the emission direction of the first light wave.

A laser tracking device according to a fourteenth aspect, which is configured as the laser tracking device according to the first aspect, is configured to incorporate an atmosphere measurement device (190).

With the adjustment device (110) modifying the emission direction of the first light wave based on the state of atmosphere measured by the atmosphere measurement device, the laser tracking device can correct an error in relation to the emission direction of the first light wave.

This application claims priority on the basis of Japanese Patent Application No. 2020-214709, filed on Dec. 24, 2020, the disclosure of which is incorporated herein by reference in its entirety.

The invention claimed is:

1. A laser tracking device, comprising:
   an adjustment device that modifies an emission direction of first light wave;
   a telescope that emits the first light wave in the emission direction modified by the adjustment device; and
   a drive device that rotates the telescope based on a predicted path of a moving body,
   wherein the adjustment device provides more precision in modifying the emission direction of the first light wave than in the drive device rotating the telescope, and
   wherein the adjustment device modifies the emission direction to offset modification of the emission direction caused by rotation of the telescope from a time when a tracking start condition is satisfied until the moving body is detected.

2. The laser tracking device according to claim 1, wherein a speed at which the adjustment device modifies the emission direction is lower than or equal to a speed at which the emission direction is modified by the rotation of the telescope.

3. The laser tracking device according to claim 1, wherein a speed at which the adjustment device modifies the emission direction is equal to a speed at which the emission direction is modified by the rotation of the telescope.

4. The laser tracking device according to claim 1, further comprising:
   a light receiving device that receives second light wave that includes reflected light produced by the first light wave being reflected by the moving body; and
   a processing device that determines whether the second light wave includes the reflected light,
   wherein the processing device determines that the moving body is detected when the second light wave includes the reflected light and calculates an error between the predicted path and a position of the moving body based on detection of the moving body, and
   wherein the adjustment device modifies the emission direction based on the error.

5. The laser tracking device according to claim 4, further comprising:
   a splitter device that guides the first light wave from the adjustment device to the telescope and guides the reflected light from the telescope to the light receiving device.

6. The laser tracking device according to claim 4, further comprising:
   a splitter device that guides the first light wave to the adjustment device,
   wherein the adjustment device receives the reflected light from the telescope and modifies a travel direction of the received reflected light, and
   wherein the splitter device guides the reflected light from the adjustment device to the light receiving device.

7. The laser tracking device according to claim 4, wherein the telescope comprises:
   an emission telescope that emits the first light wave; and
   a light receiving telescope that receives the reflected light.

8. The laser tracking device according to claim 7, wherein the adjustment device comprises:
   an emission adjustment device that emits the first light wave to the emission telescope; and
   a light reception adjustment device that guides the reflected light from the light receiving telescope to the light receiving device.

9. The laser tracking device according to claim 7, wherein the drive device comprises:
   an emission drive device that rotates the emission telescope; and
   a light reception drive device that rotates the light receiving telescope.

10. The laser tracking device according to claim 4, wherein the light receiving device comprises:
    a first light receiving device that receives the second light wave; and
    a second light receiving device that receives third light wave emitted from the moving body.

11. The laser tracking device according to claim 10, wherein the third light wave does not include the reflected light.

12. The laser tracking device according to claim 4, wherein the light receiving device comprises:
    a first light receiving device that receives the second light wave; and
    a temperature measurement device that measures a temperature of an object located in an axial direction of the telescope, and
    wherein the processing device determines that the moving body is detected when the second light wave includes the reflected light or when the moving body exists within a range within which the temperature measurement device performs the measurement.

13. The laser tracking device according to claim 1, further comprises a storage device that stores a parameter that influences the emission direction,
    wherein the adjustment device modifies the emission direction of the first light wave based on the parameter.

14. The laser tracking device according to claim 1, further comprising:
    an atmosphere measurement device that measures a state of atmosphere along a light path of the first light wave,
    wherein the adjustment device modifies the emission direction of the first light wave based on the state of atmosphere.

* * * * *